(12) United States Patent
Keene et al.

(10) Patent No.: US 9,472,812 B2
(45) Date of Patent: Oct. 18, 2016

(54) ELECTRIC ENERGY CELL

(71) Applicant: Biosearch, L.L.C., Sarasota, FL (US)

(72) Inventors: Talmadge Kelly Keene, Ruskin, FL (US); Rebecca Van Orden, North Port, FL (US); Charles E. Entenmann, Key Largo, FL (US); David Cottrell, Ft. Myers, FL (US)

(73) Assignee: BIOSEARCH, LLC, Sarasota, FL (US)

( * ) Notice: Subject to any disclaimer, the term of this patent is extended or adjusted under 35 U.S.C. 154(b) by 0 days.

(21) Appl. No.: 15/007,750

(22) Filed: Jan. 27, 2016

(65) Prior Publication Data
US 2016/0240863 A1 Aug. 18, 2016

Related U.S. Application Data

(60) Provisional application No. 62/209,438, filed on Aug. 25, 2015, provisional application No. 62/187,413, filed on Jul. 1, 2015, provisional application No. 62/115,244, filed on Feb. 12, 2015.

(51) Int. Cl.
*H01M 10/44* (2006.01)
*H01M 6/02* (2006.01)
*H01M 4/38* (2006.01)

(52) U.S. Cl.
CPC ............... *H01M 6/02* (2013.01); *H01M 4/383* (2013.01)

(58) Field of Classification Search
CPC .......................... H01M 6/02; H01M 4/383
See application file for complete search history.

(56) References Cited

U.S. PATENT DOCUMENTS

| | | | |
|---|---|---|---|
| 6,495,281 B1 * | 12/2002 | Eshraghi | H01M 4/661 429/140 |
| 7,297,434 B2 | 11/2007 | Tanaka | |
| 7,887,973 B2 * | 2/2011 | Nakanishi | H01M 8/004 429/413 |
| 8,507,140 B1 | 8/2013 | Chou et al. | |
| 9,182,365 B2 | 11/2015 | Kidwell | |
| 2006/0093874 A1 * | 5/2006 | Patterson | G21B 3/00 422/186 |
| 2013/0101911 A1 | 4/2013 | Anastasopoulos et al. | |

FOREIGN PATENT DOCUMENTS

CN 101083325 A * 12/2007

OTHER PUBLICATIONS

Solid Oxide Fuel Cell, Wikipedia, https://en.wikipedia.org/wiki/Solid_oxide_fuel_cell.

* cited by examiner

*Primary Examiner* — Jane Rhee
(74) *Attorney, Agent, or Firm* — Charles J. Prescott

(57) ABSTRACT

An electrical cell and method for generating electrical power are disclosed for producing electrical energy from a gas such as hydrogen and isotopes thereof. The electrical cell comprises an ionizing material located within an interior volume of a housing for absorbing the gas and separating ions and electrons. An electron collector receives electrons generated by the ionizing material. An insulator material within the housing inhibits electrons from entering into an ion collector while allowing the gas and the ions to pass to the ion collector for generating electrical voltage between the electron collector and the ion collector.

9 Claims, 30 Drawing Sheets

| V. | ANODE/CONDUCTOR/<br>I ALT/CATHODE | ECT2 | AN | C | I ALT | CAT | ECT1 |
|---|---|---|---|---|---|---|---|
| VI. | SEMICONDUCTOR/<br>ANODE/I ALT/<br>SEMICONDUCTOR/<br>CATHODE | ECT2 | SC | AN | I ALT | SC | CAT | ECT1 |
| VII. | SEMICONDUCTOR/<br>ANODE/I ALT/<br>CATHODE | ECT2 | SC | AN | I ALT | CAT | ECT1 |
| VIII. | ANODE/I ALT/<br>SEMICONDUCTOR/<br>CATHODE | ECT2 | AN | I ALT | SC | CAT | ECT1 |
| IX. | SEMICONDUCTOR/<br>ANODE/INSULATOR/<br>I ALT/SEMICONDUCTOR/<br>CATHODE | ECT2 | SC | AN | I | I ALT | SC | CAT | ECT1 |
| X. | SEMICONDUCTOR/<br>ANODE/INSULATOR/<br>I ALT/CATHODE | ECT2 | SC | AN | I | I ALT | CAT | ECT1 |
| XI. | ANODE/INSULATOR/<br>I ALT/SEMICONDUCTOR/<br>CATHODE | ECT2 | AN | I | I ALT | SC | CAT | ECT1 |
| XII. | SEMICONDUCTOR/<br>ANODE/CONDUCTOR/<br>I ALT/SEMICONDUCTOR/<br>CATHODE | ECT2 | SC | AN | C | I ALT | SC | CAT | ECT1 |

*FIG. 2C*

ELECTRIC ENERGY CELL

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to a novel form of an electric generator that produces electric energy by fuel cell-like principles.

2. Description of Related Art

Fuel Cell

A fuel cell is a device that converts chemical energy from a fuel into electricity through a chemical reaction between positively charged hydrogen ions and oxygen or another oxidizing agent. Fuel cells are different from batteries in that they require a continuous source of fuel and oxygen or air to sustain the chemical reaction, whereas in a battery the chemicals present in the battery react with each other to generate an electromotive force (EMF). Fuel cells can produce electricity continuously for as long as these inputs are supplied.

There are many types of fuel cells, but most consist of an anode, a cathode, and an electrolyte that allow positively charged hydrogen ions (or protons) to move between the two sides of the fuel cell. The anode is a catalyst that causes the fuel to undergo oxidation reactions that generate positive hydrogen ions and electrons. The hydrogen ions are drawn through the electrolyte after the reaction. At the some time, electrons are drawn from the anode to the cathode through an external circuit, producing direct current electricity. At the cathode, hydrogen ions, electrons, and oxygen react to form water.

As the main difference among fuel cell types is the electrolyte, fuel cells are classified by the type of electrolyte they use and by the difference in startup time ranging from one second for proton exchange membrane fuel cells (PEM fuel cells, or PEMFC) to 10 minutes for solid oxide fuel cells (SOFC). SOFC fuel cells transport an oxygen ion (rather than transporting a proton), but the overall redox reaction to produce electricity is essentially the same as PEM fuel cells. Individual fuel cells produce relatively small electrical potentials, about 0.7 volts, so cells are "stacked," or placed in series, to produce sufficient voltage to meet an application's requirements. Electrical current is relative to the size or surface area of a given cell.

In addition to electricity, fuel cells produce water, heat and, depending on the fuel source, very small amounts of nitrogen dioxide and other emissions. The energy efficiency of a fuel cell is generally between 40%-60%, or up to 85% efficient in cogeneration if waste heat is captured for use. The heat is produced at the cathode, where the protons and electrons combine with the oxygen to produce water.

A. Types of Fuel Cell Designs

Fuel cells come in many varieties; however, they all work in the same general manner. They are made up of three adjacent segments: the anode, the electrolyte, and the cathode. Two chemical reactions occur at the interfaces of the three different segments. The net result of the two reactions is that fuel is consumed, water or carbon dioxide is produced, and an electric current is produced, which can be used to power electrical devices, normally referred to as the load.

At the anode, a catalyst oxidizes the fuel, usually hydrogen, turning the fuel into a positively charged ion and a negatively charged electron. The electrolyte is a substance specifically designed so ions can pass through it, but the electrons cannot. The freed electrons travel through a wire producing the electric current. The ions travel through the electrolyte to the cathode. Once reaching the cathode, the ions are reunited with the electrons and the two react with a third chemical, usually oxygen, to form water or carbon dioxide.

The most important design features in a fuel cell are:

The electrolyte substance which usually defines the type of fuel cell.

The fuel that is used, most commonly hydrogen.

The anode catalyst breaks down the fuel into electrons and ions, usually very fine platinum powder.

The cathode catalyst turns the ions into the waste chemicals like water or carbon dioxide. The cathode catalyst is often made up of nickel but it can also be a nano-material-based catalyst.

A typical fuel cell produces a voltage from 0.6 V to 0.7 V at full rated load. Voltage decreases as current increases, due to several factors:

Activation loss

Ohmic loss (voltage drop due to resistance of the cell components and interconnections)

Mass transport loss (depletion of reactants at catalyst sites under high loads, causing rapid loss of voltage).

To deliver the desired amount of energy, the fuel cells can be combined in series to yield higher voltage, and in parallel to allow a higher current to be supplied. Such a design is called a fuel cell stack. The cell surface area can also be increased, to allow higher current from each cell. Within the stack, reactant gases must be distributed uniformly over each of the cells to maximize the power output.

1. Proton Exchange Membrane Fuel Cells (PEMFCs)

In the archetypical hydrogen-oxide proton exchange membrane (PEM) fuel cell design, a proton-conducting polymer membrane (the electrolyte) separates the anode and cathode sides. This was called a "solid polymer electrolyte fuel cell" (SPEFC) in the early 1970s, before the proton exchange mechanism was well-understood. The PEM will transport $H^+/D^+$, but not electrons.

On the anode side, hydrogen diffuses to the anode catalyst where it later dissociates into protons and electrons. These protons often react with oxidants causing them to become what are commonly referred to as multi-facilitated proton membranes. The protons are conducted through the membrane to the cathode, but the electrons are forced to travel in an external circuit (supplying power) because the membrane is electrically insulating. On the cathode catalyst, oxygen molecules react with the electrons (which have traveled through the external circuit) and protons to form water.

The different components of a PEMFC are;

1. bipolar plates,
2. electrodes,
3. catalyst, 4. membrane, and
5. necessary hardware.

The materials used for different parts of the fuel cells differ by type. The bipolar plates may be made of different types of materials, such as, metal, coated metal, graphite, flexible graphite, C—C composite, carbon-polymer composites etc. The membrane electrode assembly (MEA) is referred as the heart of the PEMFC and is usually made of a proton exchange membrane sandwiched between two catalyst-coated carbon papers. Platinum and/or a similar type of noble metals are usually used as the catalyst for PEMFC. The electrolyte could be a polymer membrane.

2. Phosphoric Acid Fuel Cell (PAFC)

In these cells, phosphoric acid is used as a non-conductive electrolyte to pass positive hydrogen ions from the anode to the cathode. These cells commonly work in temperatures of 150 to 200 degrees Celsius. Phosphoric acid, the electrolyte used in PAFCs, is a non-conductive liquid acid which forces electrons to travel from anode to cathode through an external electrical circuit. Since the hydrogen ion production rate on the anode is small, platinum is used as catalyst to increase this ionization rate. A key disadvantage of these cells is the use of an acidic electrolyte, which increases the corrosion or oxidation of components exposed to phosphoric acid.

3. High-Temperature Fuel Cells a) SOFC

Solid oxide fuel cells (SOFCs) use a solid material, most commonly a ceramic material called yttria-stabilized zirconia (YSZ), as the electrolyte. Because SOFCs are made entirely of solid materials, they are not limited to the flat plane configuration of other types of fuel cells and are often designed as rolled tubes. They require high operating temperatures (800°-1000° C.) and can be run on a variety of fuels including natural gas.

SOFCs are unique since in those, negatively charged oxygen ions travel from the cathode (positive side of the fuel cell) to the anode (negative side of the fuel cell) instead of positively charged hydrogen ions travelling from the anode to the cathode, as is the case in all other types of fuel cells. Oxygen gas is fed through the cathode, where it absorbs electrons to produce oxygen ions. The oxygen ions then travel through the electrolyte to react with hydrogen gas at the anode. The reaction at the anode produces electricity and water as by-products. Carbon dioxide may also be a by-product depending on the fuel, but the carbon emissions from an SOFC system are less than those from a fossil fuel combustion plant. The chemical reactions for the SOFC system can be expressed as follows:

$2H_2 + 2O^{2-} \rightarrow 2H_2O + 4e^-$     Anode Reaction:

$O_2 + 4e^- \rightarrow 2O^{2-}$     Cathode Reaction:

$2H_2 + O_2 \rightarrow 2H_2O$     Overall Cell Reaction:

SOFC systems can operate on fuels other than pure hydrogen gas. However, since hydrogen is necessary for the reactions listed above, the fuel selected must contain hydrogen atoms. For the fuel cell to operate, the fuel must be converted into pure hydrogen gas. SOFCs are capable of internally reforming light hydrocarbons such as methane (natural gas).

b) Hydrogen-Oxygen Fuel Cell (Bacon Cell)

This cell consists of two porous carbon electrodes impregnated with a suitable catalyst such as Pt, Ag, CoO, etc. The space between the two electrodes is filled with a concentrated solution of KOH or NaOH which serves as an electrolyte. $2H_2$ gas and $O_2$ gas are bubbled into the electrolyte through the porous carbon electrodes. Thus, the overall reaction involves the combination of hydrogen gas and oxygen gas to form water. The cell runs continuously until the reactant's supply is exhausted.

c) MCFC

Molten carbonate fuel cells (MCFCs) require a high operating temperature, 650° C. (1,200° F.), similar to SOFCs. MCFCs use lithium potassium carbonate salt as an electrolyte, and this salt liquefies at high temperatures, allowing for the movement of charge within the cell—in this case, negative carbonate ions.

Like SOFCs, MCFCs are capable of converting fossil fuel to a hydrogen-rich gas in the anode, eliminating the need to produce hydrogen externally. The reforming process produces $CO_2$ emissions. MCFC-compatible fuels include natural gas, biogas and gas produced from coal. The hydrogen in the gas reacts with carbonate ions from the electrolyte to produce water, carbon dioxide, electrons and small amounts of other chemicals. The electrons travel through an external circuit producing electricity and return to the cathode. There, oxygen from the air and carbon dioxide recycled from the anode react with the electrons to form carbonate ions that replenish the electrolyte, completing the circuit. The chemical reactions for an MCFC system can be expressed as follows:

$CO_3^{2-} + H_2 \rightarrow H_2O + CO_2 + 2e^-$     Anode Reaction:

$CO_2 + \frac{1}{2}O_2 + 2e^- \rightarrow CO_3^{2-}$     Cathode Reaction:

$H_2 + \frac{1}{2}O_2 \rightarrow H_2O$     Overall Cell Reaction:

The foregoing examples of the related art and limitations related therewith are intended to be illustrative and not exclusive. Other limitations of the related art will become apparent to those skilled in the art upon a reading of the specification and a study of the drawings.

LENR

LENR (Low Energy Nuclear Reactions) refers to the phenomenon where anomalous amounts of heat are produced when certain metals (e.g., nickel, palladium) absorb hydrogen or deuterium and an external stimulus such as heat or an electric current is applied. The reaction takes place at relatively low temperature and sometimes results in transmutation of elements as well as the production of heat. Either no strong radiation is produced or it is absorbed locally. The waste products are not radioactive. This phenomenon is also referred to as Cold Fusion, LANR (lattice assisted nuclear reaction), as well as other terms.

Modern interest in LENR began in 1989 when scientists Martin Fleischmann and Stanley Pons announced they had succeeded in generating nuclear reactions in laboratory experiments. This announcement sparked much interest in the media and in the scientific community, with many researchers attempting to replicate the effect in their own experiments—many without success. The effect is not always easy to replicate, particularly as the preparation of the metal was critical and it sometimes took weeks for anomalous heat to appear. When the effect has been obtained it also can be difficult to control and sustain.

There are many theories about what causes this heat effect, but none has been widely accepted or definitively proven.

There are many attempts going on at the moment by various parties to be able to replicate and control the LENR effect. Several companies are now working on commercial products with claims of producing kW of power as heat. Andrea Rossi's E-Cat invention has received a lot of attention because he was the first to publicly demonstrate his device and it has now been independently tested and validated by seven scientists, funded by the Swedish R&D organization Elforsk, demonstrating at least ten times the energy of any known chemical reaction and showing that the E-Cat is capable of producing useful heat.

Various claims are made that the E-Cat has a Coefficient of Performance (COP) from 6 to over 30 (meaning between 6 and 30 times more energy is produced than is input into a system). Even at the low end such a device would make obsolete virtually all other ways of producing power. More efficient designs would be suitable for powering transport, including aircraft, although this would probably take decades to develop. This promise of inexpensive, safe, clean power is why many are now following the subject.

However, all LENR focus has been aimed at producing energy in the form of useful amounts of heat. Moreover, all prior LENR developments have required an external energy source for initiation of, and/or to sustain a meaningful energy output. The present disclosure produces energy in the form of electric power with minimal amounts of heat as a byproduct and without the need for any form of (artificial) initial energy input or continuing energy input whatsoever.

Cloud Chamber

To assist in determining whether an LENR reaction is occurring, and to identify the type of particles present, a cloud chamber may be implemented. In its most basic form, a cloud chamber is a sealed environment containing a supersaturated vapor of water or alcohol. When a charged particle (for example, an alpha or beta particle) interacts with the mixture, the fluid is ionized. The resulting ions act as condensation nuclei, around which a mist will form (because the mixture is at the point of condensation). The high energies of alpha and beta particles mean that a trail is left, due to many ions being produced along the path of the charged particle. These tracks have distinctive shapes (for example, an alpha particle's track is broad and shows more evidence of deflection by collisions, while an electron's track is thinner and straight). When any uniform magnetic field is applied across the cloud chamber, positively and negatively charged particles will curve in opposite directions, according to the Lorentz force law, with two particles of opposite charge.

The diffusion cloud chamber was developed in 1936 by Alexander Langsdorf. This chamber differs from the expansion cloud chamber in that it is continuously sensitized to radiation, and in that the bottom must be cooled to a rather low temperature, generally as cold as −26° C. (−15° F.). Instead of water vapor, alcohol is used because of its lower freezing point. Cloud chambers cooled by dry ice are a common demonstration and hobbyist device; the alcohol used in them is commonly isopropyl alcohol or methylated spirit. There are also water-cooled diffusion cloud chambers, using ethylene glycol.

A simple cloud chamber consists of the sealed environment, radioactive source (optionally), dry ice or a cold plate and some kind of alcohol source (which must allow easy evaporation). (See FIG. 5)

Lightweight methanol vapor saturates the chamber. The alcohol falls as it cools and the cold condenser provides a steep temperature gradient. The result is a supersaturated environment. The alcohol vapor condenses around ion trails left behind by the travelling ionizing particles. The result is cloud formation, seen in the cloud chamber by the presence of droplets falling to the condenser. As particles pass through the alcohol cloud they leave ionization trails and because the alcohol vapor is supersaturated it condenses onto these trails. Since the tracks are emitted radially out from the source, their point of origin can easily be determined.

Just above the cold condenser plate there is an area of the chamber which is sensitive to radioactive tracks. At this height, most of the alcohol has not condensed. This means the ion trail left by the radioactive particles provides an optimal trigger for condensation and cloud formation. This sensitive area is increased in height by employing a steep temperature gradient, little convection, and very stable conditions. A strong electric field is often used to draw cloud tracks down to the sensitive region of the chamber and increase the sensitivity of the chamber. While tracks from sources can still be seen without a voltage supply, background tracks are very difficult to observe. In addition, the voltage can also serve to prevent large amounts of "rain" from obscuring the sensitive region of the chamber, caused by condensation forming above the sensitive area of the chamber. This means that ion trails left by radioactive particles are obscured by constant precipitation. The black background makes it easier to observe cloud tracks.

Before tracks can be visible, a tangential light source is needed. This illuminates the white droplets against the black background. Drops should be viewed from a horizontal position. If the chamber is working correctly, tiny droplets should be seen condensing. Often this condensation is not apparent until a shallow pool of alcohol is formed at the condenser plate. The tracks become much more obvious once temperatures and conditions have stabilized in the chamber. This requires the elimination of any significant drift currents (resulting from poor chamber sealing).

Geiger Counter

A Geiger counter is a well-known instrument used to measure radioactivity or the amount of ionizing radiation emitted by a substance. Ionizing radiation can be beta, alpha, gamma, or x-ray. The ionizing particle excites a gas contained within a Geiger-Muller tube allowing the gas to conduct electricity. The meter typically gives outputs in counts per minute (CPM). Tubes are design to detect different particles to distinguish between types of radiation.

BRIEF SUMMARY OF THE INVENTION

The electric generator (EG) of this disclosure comprises, in a broad embodiment thereof, a single EG unit (or cell) or multiple units (cells) of EGs. In this embodiment, the cell elements of a single EG cell is represented by the following:
ECT2/Anode/Insulator/Cathode/ECT1
The single cell is composed of either pellets or powder contained within a sealed housing:
ECT (Electron Collector)=Electrically Conductive Terminal; Anode (Ionizing Material)=hydrogen/deuterium gas absorbing material which releases ions and transmits electrons therefrom;
Insulator=Non-electrically conductive materials positioned between the anode and cathode to prevent electrons from flowing therebetween while preferably allowing the gas or ionized gas within the cell to pass from (through and/or around the insulator) the anode to the cathode;
Cathode (Ion Collector)=a conductive non-hydrogen/deuterium gas absorbing material which collects ions.

A pellet is a mass of individual particles compressed to become interlocked, producing a shape or form that can be handled. The cathode component, in a variety of forms, has sufficient surface area to support the reaction. The anode component is preferably made from a palladium or hydrogen absorbing material capable of dissociating electrons from positive ions. The insulator is positioned between the anode and cathode to prevent electrons from flowing therethrough between the anode and cathode. The insulator also allows the gas within the cell to pass from the anode to the cathode. As with all embodiments herein, a hydrogen or deuterium gas ($H_2$ or $D_2$) inlet into the sealed housing is provided. $H_2$ and $D_2$ may be used interchangeably or mixed. Gas pressure of 25-50 psig was typical during testing.

Project Summary

The project began by using advancements in LENR research to directly produce electrical energy and evolved into a fuel cell-like approach. The majority of past and current LENR testing was/is focused on the phenomena of producing excess heat produced in an aqueous cell during electrolysis using a palladium cathode. The idea is that, as the palladium cathode evolves hydrogen gas during the electrolysis, the palladium absorbs the hydrogen. This absorbed hydrogen is absorbed into the palladium lattice, and via cold fusion, excess heat is produced. The excess heat is determined if the temperature of the water in the electrolysis cell increases at a rate more quickly than could be explained by the amount of electricity being introduced into the system. In theory, this excess heat may be used to produce electricity using a thermal electric device (TEG), steam turbines, or the like. This phenomenon was originally discovered in the mid 1980's, and was discredited by the science community. More recently, the U.S. Department of Energy and the U.S. Navy have come to recognize the validity of the excess energy phenomena and the U.S. Patent and Trademark Office has granted patents for excess heat generation. For this project, it is postulated in this disclosure that, if LENR is proven, it may be possible to do a directly generate electricity without the need for the aqueous system or the need for input power.

It is known that metals like palladium will reversibly absorb hydrogen or deuterium gas. As the diatomic gas is pulled into the metal, it is theorized that the gas is dissociated into two positive ions and two electrons. The positive ions reside in the lattice of the palladium, and the electrons become part of the electron field of the palladium alloy. Thus, the focus of this disclosure became, "Is it possible to take advantage of the $H_2$ or $D_2$ associated electrons to do work?"

This project has developed into two stages: Stage 1 directed to an LENR-focused field of electrical work; and Stage 2, a system that is more similar to that of a fuel cell. The two stages are distinguished when $H_2$ or $D_2$ gas, flowing into a sealed housing containing palladium or a hydrogen absorbing material, produces an ionized gas capable of conducting electricity across an electrical insulator. Prior to this point, in Stage 1 the electrical power (voltage and current) that had been seen could not be understood, replicated, or manipulated.

Stage 1

Stage 1 included testing over 1,300 cells. Early cells exhibited fluctuations in voltage and reversals of polarity completely at random. Semiconductors were added to the configuration in attempts to direct the flow of electrons in one direction and to stabilize voltage fluctuations. The semiconductors did not, however, solve either the voltage fluctuation or reversals of polarity. Next, lithium salts and boron, both elements known to interact with nuclear reactions, were added to the cells. The addition of the lithium and boron stabilized the cells and the fluctuations and reversals of polarity stopped. But neither the lithium nor boron produced extremely elevated voltage spikes that would be expected from a nuclear reaction. It was also learned that too thin a layer or too high percentage of boron resulted in the return of the fluctuations and polarity reversals.

Once the random outputs of the cells were stabilized, the focus turned to increasing the voltage and current outputs. Several different materials were tested, but the best material seemed to be a wetted palladium nitrate hexahydrate salt kilned on supplemental material to produce a conductive material. The wetting of the salt, combined with the kilning, seems to produce very small crystals of palladium in and on the supplemental material (PdC). Cells were made with other palladium and nickel salts, palladium black, palladium foil, palladium oxide, and other hydrogen absorbing materials. All produced electricity, but the PdC worked best in these tests.

The initial purpose of the carbon was to prevent oxidation of materials during the kilning process. Previously, the salts and materials were kilned under argon or carbon dioxide ($CO_2$) to prevent oxidation and produced crystals and strands of what is thought to be palladium metal. Since small amounts of carbon are used to prevent iron from oxidizing during smelting, it was thought that the same mechanism could be employed to prevent oxidation of the palladium during the kilning process. The carbon in the anode supports crystal growth, an electrically conductive matrix, minimizes expansion of the pellet, and controls heat produced during the exothermic loading of the deuterium/hydrogen gas. Palladium nitrate was also kilned on a variety of supplemental materials resulting in a conductive materials that produced electrical power. Other salts of palladium and other metal salts were also tested and produced electrical power. The PdC from the palladium nitrate hydrate worked well in the cells; therefore, it became the material of choice moving forward.

Two cells were assembled that have produced ~500 mV for over 15 months. These cells contained copper conductor ends (ECTs) each adjacent to semiconductors, with LiFB adjacent to the N semiconductor (SC) and PdC adjacent to the P-SC (See FIG. 2A and VI). All of the graphs indicate negative voltage due to the way the leads were connected to the data acquisition device (DAQ). It was expected that the PdC would excite the LiFB and the electrons would flow out of the LiFB to the N-SC and exit the cell. Actually, the electron flow was the reverse of expectations, flowing out of the PdC. The leads in the DAQ were never changed to prevent confusion. The cells have not been reloaded with gas for over 12 months and are continually producing voltage.

A stack of seven cells was assembled in a single sealed housing that briefly illuminated an LED. Unlike batteries, the cells will not add voltage when put in series. Cells in series in separate containers were found to be voltage additive, but multiple cells in the same container were not additive. In Stage 1 there was no explanation for this phenomena.

A cloud chamber and a Geiger counter were used to determine the presence of radioactivity. There was some weak indication of an increase in radiation from the cells, but the testing was not repeatable and was unreliable. Particles were seen leaving the open cells in a cloud chamber (See FIGS. 8 and 9). The amount of particles could not explain the current being produced by the cells.

Transition from Stage 1 the Stage 2

In Stage 1, it was thought that at the interface of the PdC and the LiFB there was a reaction taking place producing the observed electrical power. Based on other LENR phenomena, there was the possibility that the reactions were nuclear in nature. It was thought that this interface reaction was producing the recorded electrical power. Why the electrons flowed backwards to expectation was still unexplainable. In an attempt to better understand what possible nuclear reactions were happening in the cells, different materials were placed between the LiFB and the PdC in an attempt to block different radioactive particles (See FIG. 17). When a piece of paper was placed between the LiFB and the PdC, the cells still produced electrical power and the cells had sufficient conductivity to be measured by a multi-meter.

The occurrence of electrical power with paper (a known electrical insulator) between what was thought to be the anode and cathode led to further resistance testing of cells. Cells with a piece of paper (or multiple layers of paper), glass wool, air, plastic or other insulators measured over 200 MΩ under vacuum or argon, but dropped to <5 MΩ upon the introduction of $H_2$ or $D_2$ gas into the sealed housing. These tests were repeated several times with different cells and different materials. During Stage 1, variations in resistance were recorded, but not analyzed. This resistance testing during the transition from Stage 1 to Stage 2 focused on testing with known non-conductive ion permeable insulators that reflected high resistance measured across the cell until the $H_2$ or $D_2$ gas was introduced into the sealed housing. The addition of either of these gases was found to dramatically reduce the resistance measured across the cell as an indication that the cell had begun to produce electrical power as more fully described below. The resistance testing became another indication of the production of electrical power by the cell upon the addition of the $H_2$ or $D_2$ gas.

In further attempts to produce electrical power directly, different materials were tested in place of the LiFB. LiFB was replaced with LiF (boron removed) with no impact to the cell. When the LiFB was replaced with LiOH (hydroxide), the cell did not conduct electricity when $H_2$ or $D_2$ gas was added. In a cell with LiI (iodine), upon the addition of $H_2$ or $D_2$ gas, there was an immediate brown staining of the adjacent glass wool insulator, typical of iodine staining. Based on the resistance testing and the lithium iodine decomposition, it was postulated that the PdC was ionizing the incoming $H_2$ or $D_2$ gas. It was incorrectly assumed that the ionized gas was splitting the LiF component and producing electricity in the process.

The addition of the insulator stabilized the cells and prevented the reversal of polarity. Cells from Stage 1 with a thin LiFB section, or a high ratio of boron, would not allow the cell to function. This is because LiF is non-conductive, but boron is a conductive material. To stabilize the cells an insulating layer/material was needed to prevent internal flow of electrons. If the cell was allowed to internally conduct electricity, then the cell behaved erratically with reversals of polarity. The insulator inhibits internal electron flow through the insulator within the cell and forces electrons to flow only external to the cell to complete the circuit.

Stage 2

To begin Stage 2, it was thought that the PdC was absorbing and ionizing the $H_2$ or $D_2$ gas and that the ionized gas was reacting with the LiF to produce electrical power. It was believed that the overall reaction was simply two half-cell reactions similar to that of a battery. Although the half-cell potential calculations for the LiF and the PdC with the gas could not be determined, the LiF component was replaced with several different materials ($AlF_3$, $ZnF_2$, NaCl, Ni, Al, etc.). The purpose of this testing was to find a material that would produce higher voltages due to differences in half-cell potentials. The LiF material produced approximately 500 mV. Surprisingly, testing the other materials always resulted in a similar voltage output, unless the other materials were known to absorb $H_2$ or $D_2$ gas. For example, replacing the LiF with Ni or Al produced a positive potential voltage, but no measurable current. With an insulator in place, changing the LiF material to ZnF had no impact on the voltage produced. This refuted the two-half-cell battery theory.

The next step was to build a cell with two copper, end connectors (ECTs), an insulator, and PdC (See FIG. 1). This cell allowed for conductance on a multi-meter and produced voltage. The voltage produced was in the 500 mV range. Further testing demonstrated that the amount of copper on the cathode side (e.g., a short stand of wire vs. a longer strand of wire) impacts the electrical power (current) of the cell.

Aspects of Electrical Generation

Despite having run nearly 1,500 cells, it is not known why the cells are producing electricity. It is unexplainable why two small cells have produced electricity for over 15 months with no additional fuel. Although it is not fully understood, it is postulated that the PdC anode ionizes the hydrogen/deuterium gas, and ions are released from the PdC into the internal volume of the cell housing to produce a net negative material. The ions in the gas recombine on the copper cathode with electrons in the copper, electrons being pulled into the cathode externally of the housing from the anode. This invention functions similar to a fuel cell, except that there is no constant input of fuel, and there is no electrolyte to transport ions, as required in a fuel cell. The ions are part of the gas cloud inside the cell housing.

This disclosure is believed to be the beginning of a new type of energy cell with many operational variations on these original cells expected. There may be other uses for this discovered ionization phenomena, such as for a gasification purification system for metal salts that react in aqueous systems, to transmit electricity, an electrical switch, wound treatment, production of an antimicrobial gas, and/or to produce propulsion for space engines, to name a few other potential uses.

LiF or LiFB from a Stage 1 Cathode to an Insulator Alternate (I Alt)

In Stage 1 it was thought that the lithium component acted as a cathode, but it was later determined that the copper is most likely the cathode and the LiF was acting only as an insulator (insulator alternative). The electrical insulation properties of the LiF possibly are what stabilized the cells in Stage 1. As learned in Stage 2, although the cell elements, lithium/boron/semiconductors, may not all be needed to produce voltage, the two cells that have been running for over 15 months contain those elements. The LiFB material may be adding longevity to those cells. While LiF or LiFB are not typical insulators, they are functional insulators in this system. This is potentially just one example of an "insulator alternative" that can be used in these cells.

BRIEF DESCRIPTION OF THE SEVERAL VIEWS IN THE DRAWINGS

The following embodiments and aspects thereof are described and illustrated in conjunction with systems, tools, and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference to the drawings and by study of the following descriptions.

FIGS. 2B and 2C show schematic views summarizing all embodiments I to XII of this disclosure, which are keyed to the Outline of Embodiments herebelow.

Figure 4:
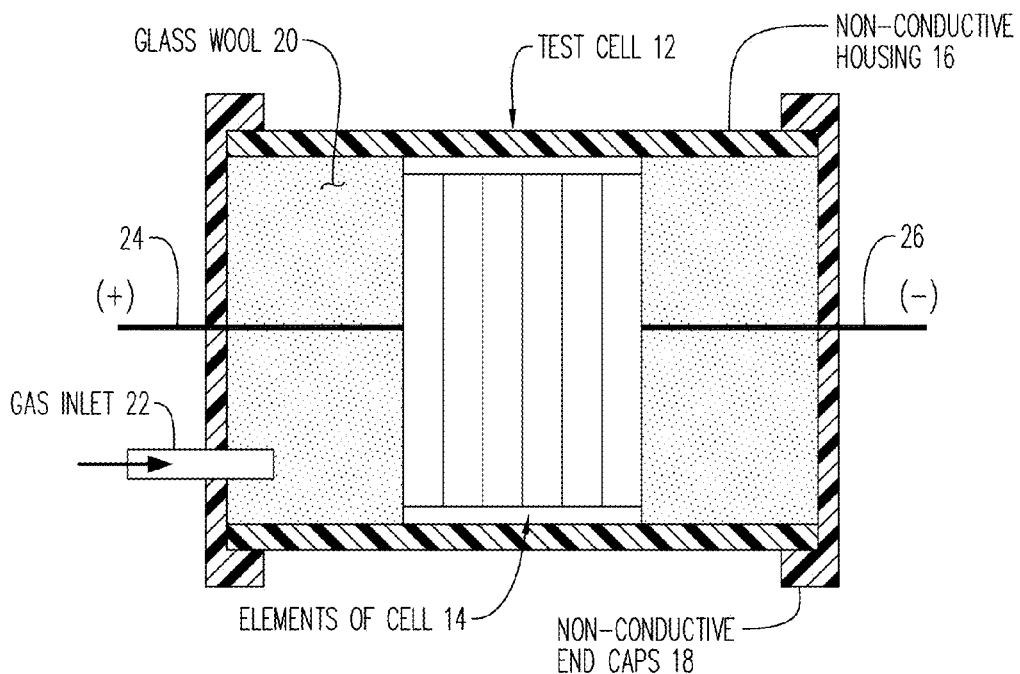
FIG. 4 is a side section view of one embodiment of test cell 12.
Figure 8:
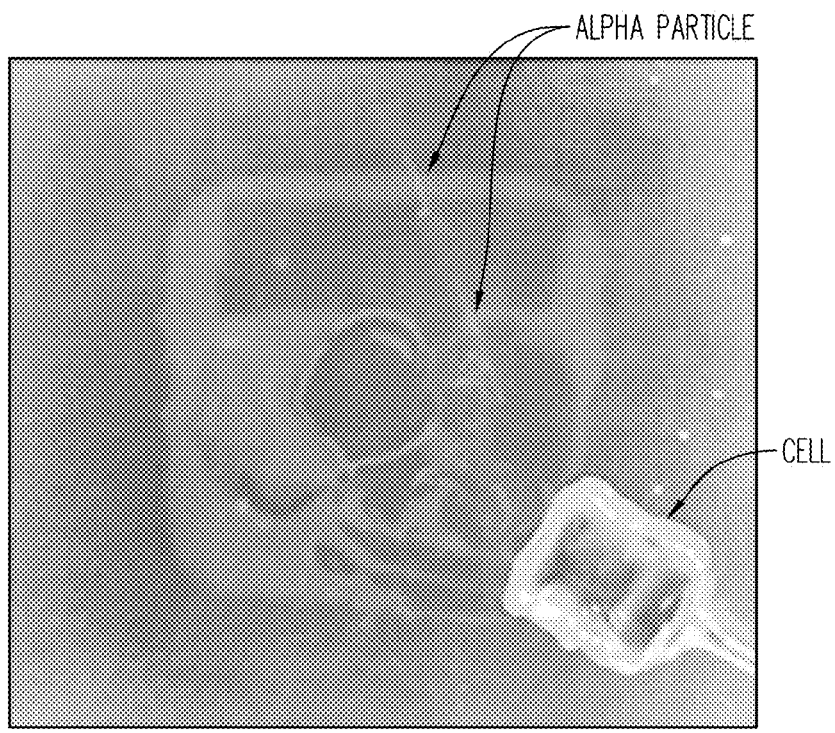
Figure 9:
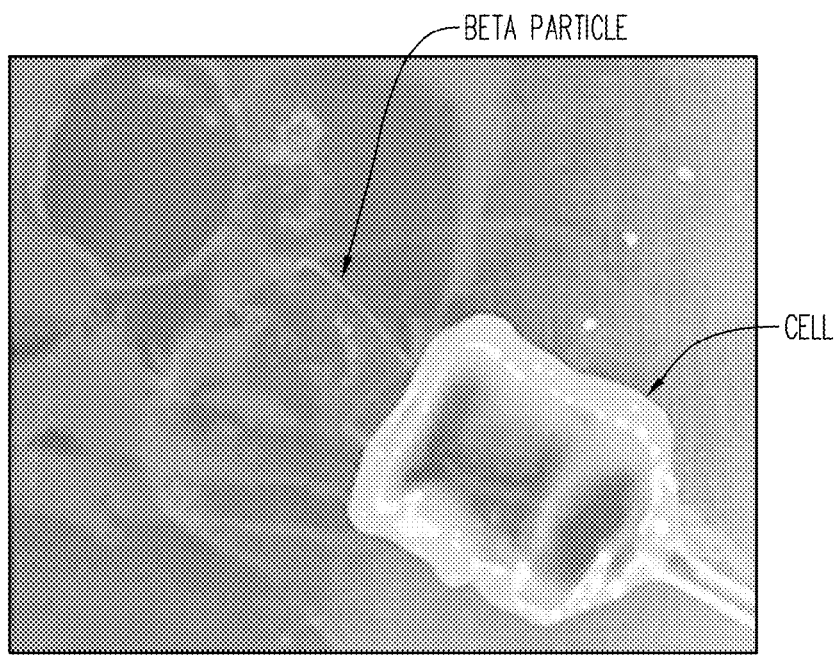

FIGS. 8 and 9 are photographic views of test cell 12 of FIG. 4 being tested in cloud chamber 30.

Figure 2A:
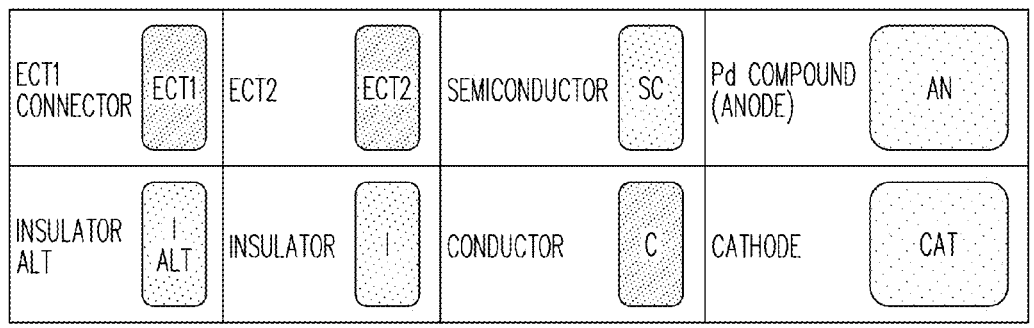
FIG. 2A is a section view of key codes of cell elements in FIGS. 2B and 2C.
Figure 2B:
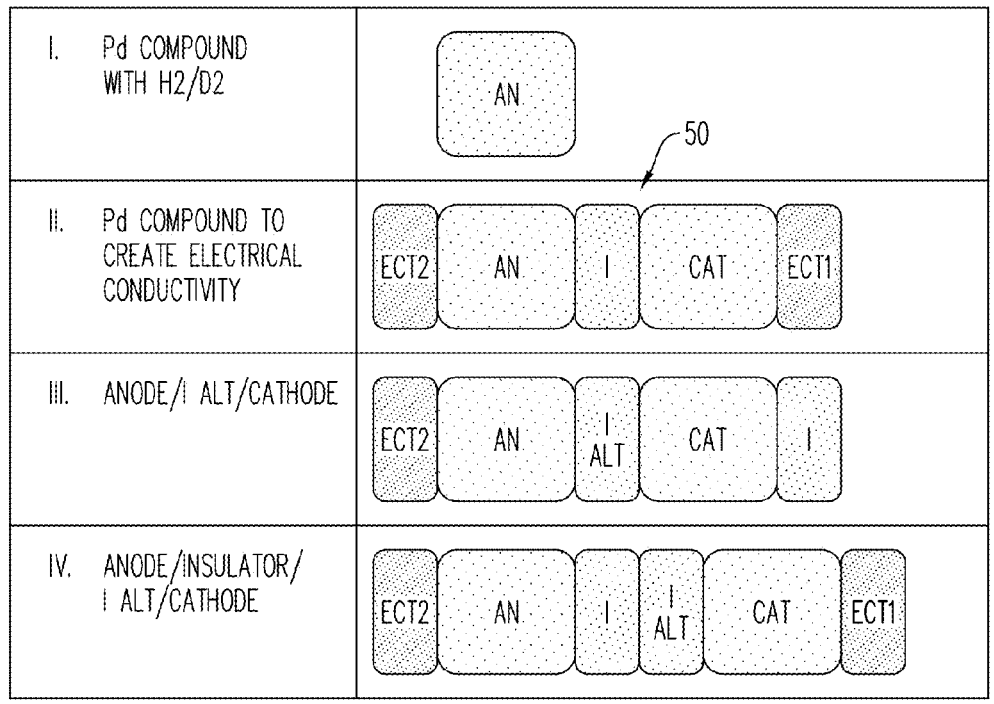
Figure 10:
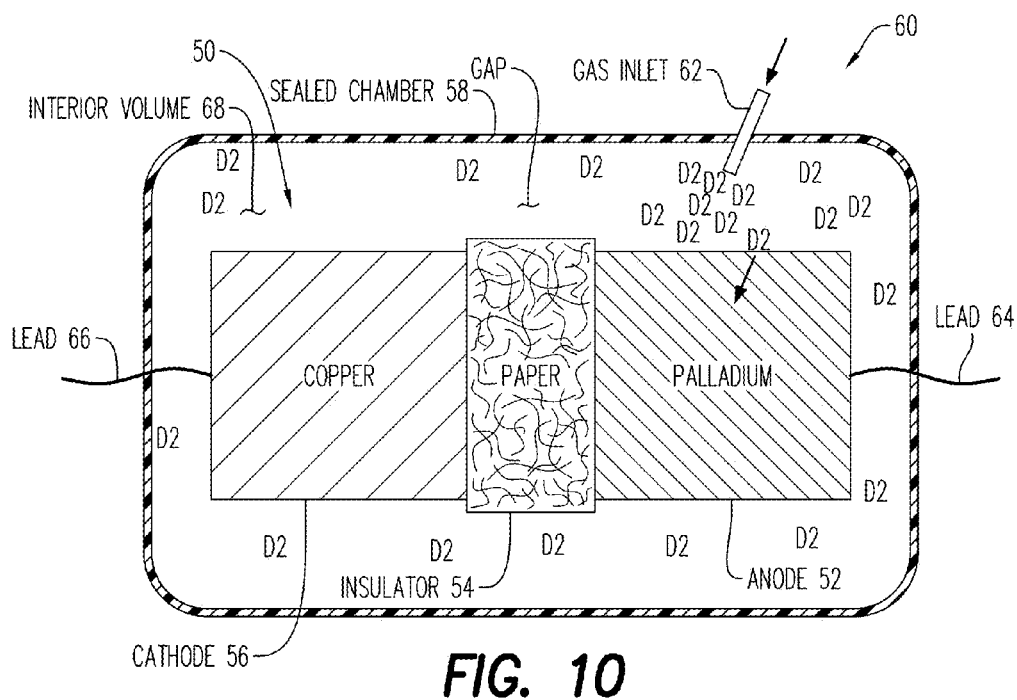

FIG. 10 is a schematic section view of element 50 positioned within a sealed housing 58 forming test cell 60 which corresponds to test cell II shown diagrammatically in FIG. 2B, depicting the introduction and progression of $D_2$ gas into the sealed housing 58 of test cell 60.

Figure 11:
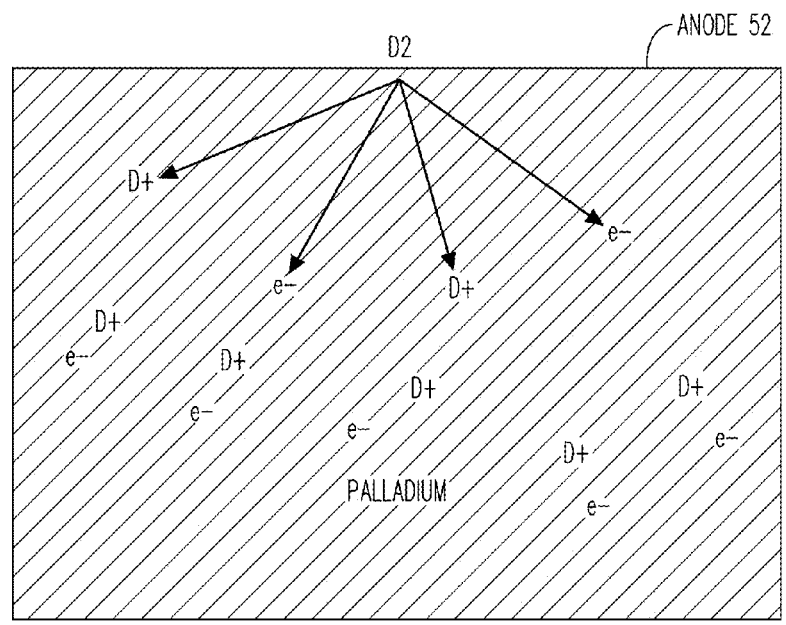
Figure 12:
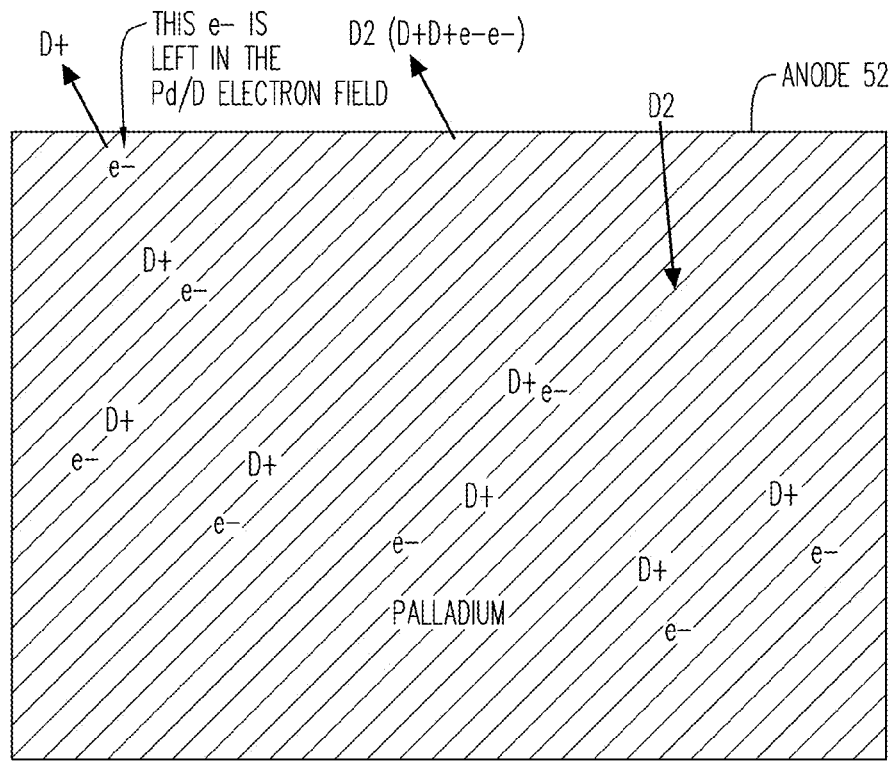
Figure 13:
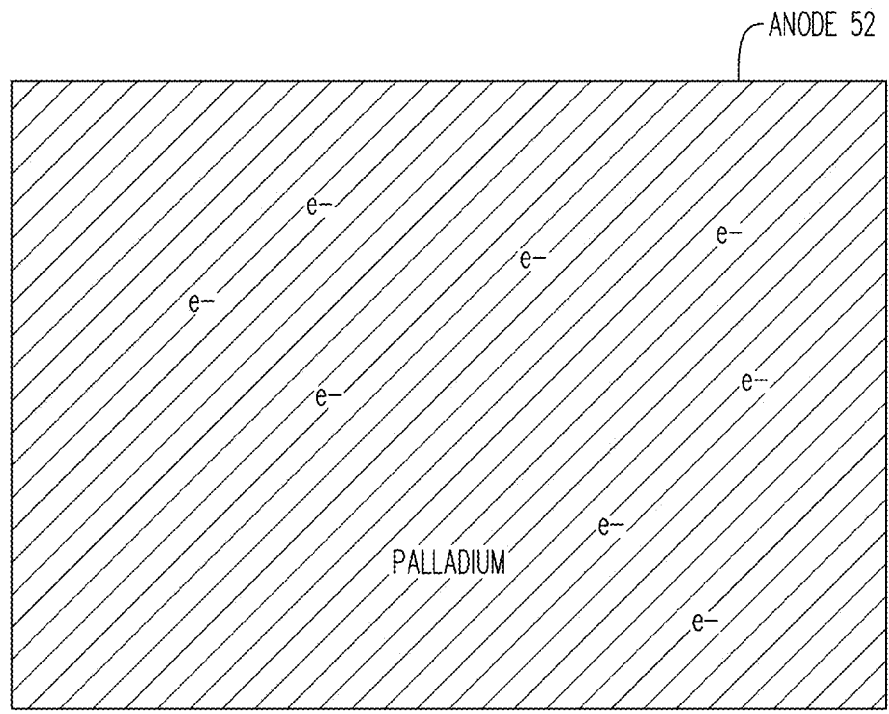

FIGS. 11 to 13 are schematic section views of anode 52 showing the progression of $D_2$ into the anode 52 and separation of $D_2$ into ions ($D^+$) and electrons ($e^-$).

Figure 14:
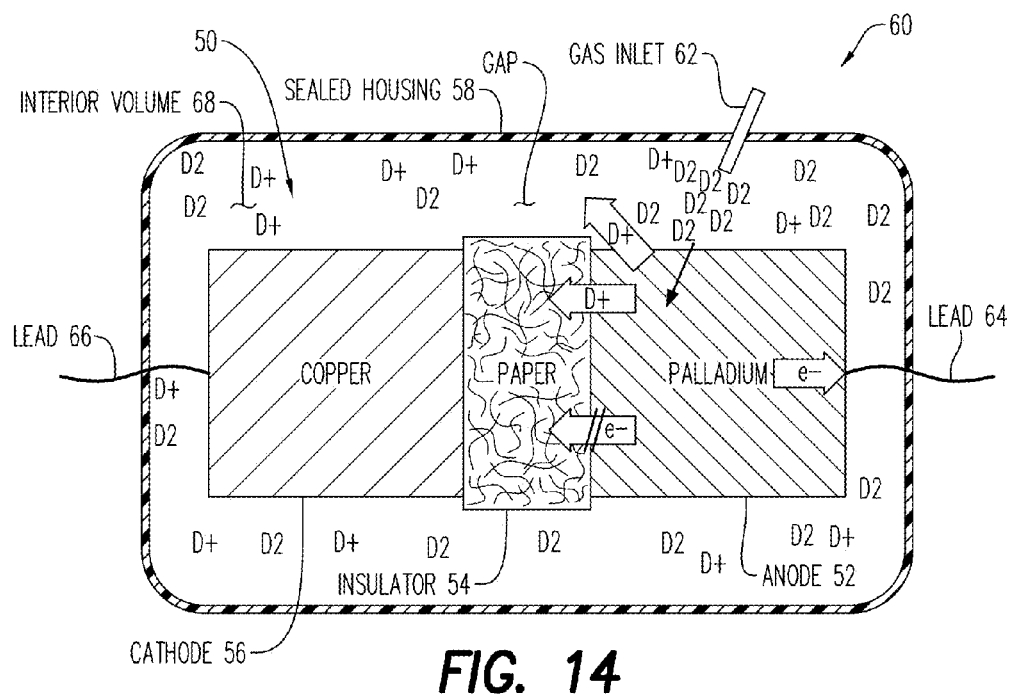

FIG. 14 is a section view of test cell 60 depicting absorption of $D_2$ and movement of ions ($D^+$) and electrons ($e^-$).

Figure 15:
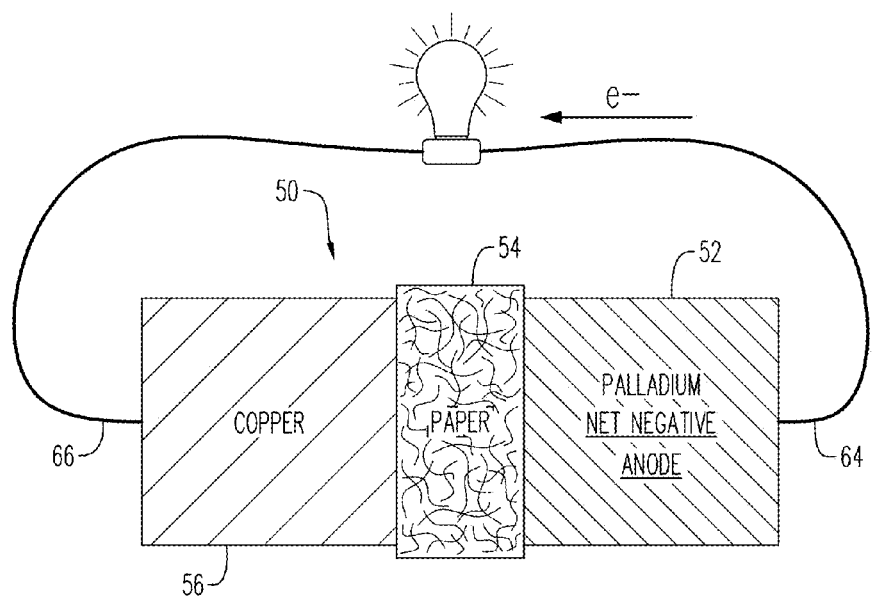

FIG. 15 is a representation of the stabilized electron and current flow between the elements 52 and 56.

Figure 16:
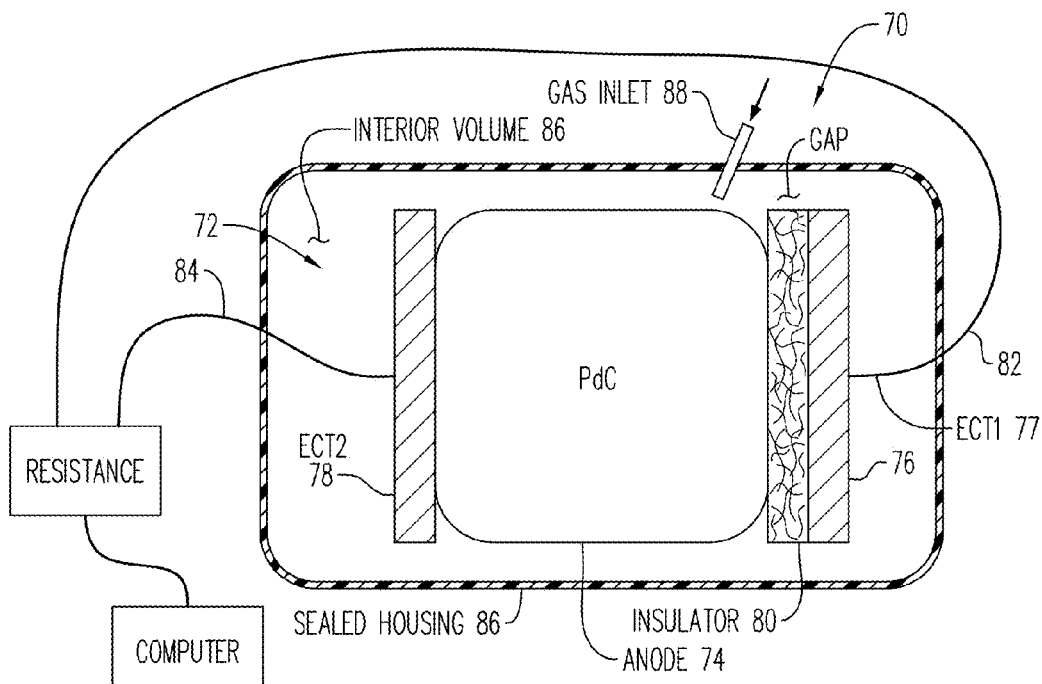

FIG. 16 is a schematic section view of another embodiment of test cell 70.

Figure 17:
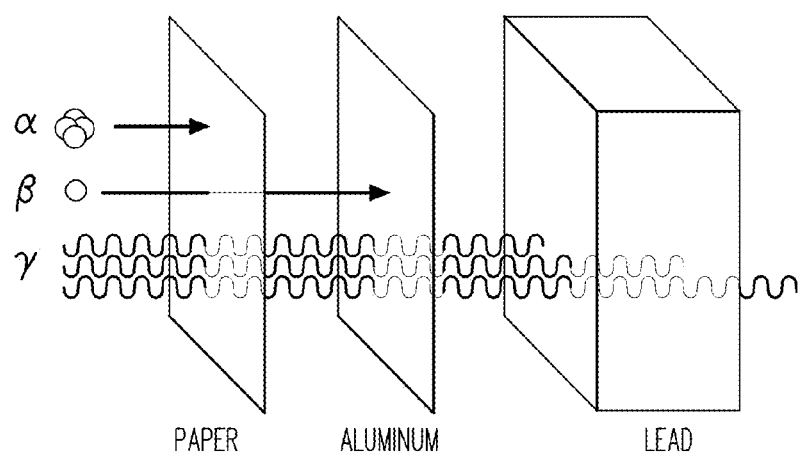

FIG. 17 is a schematic diagram showing blockage of different types of radiation by a variety of materials.

Figure 18:
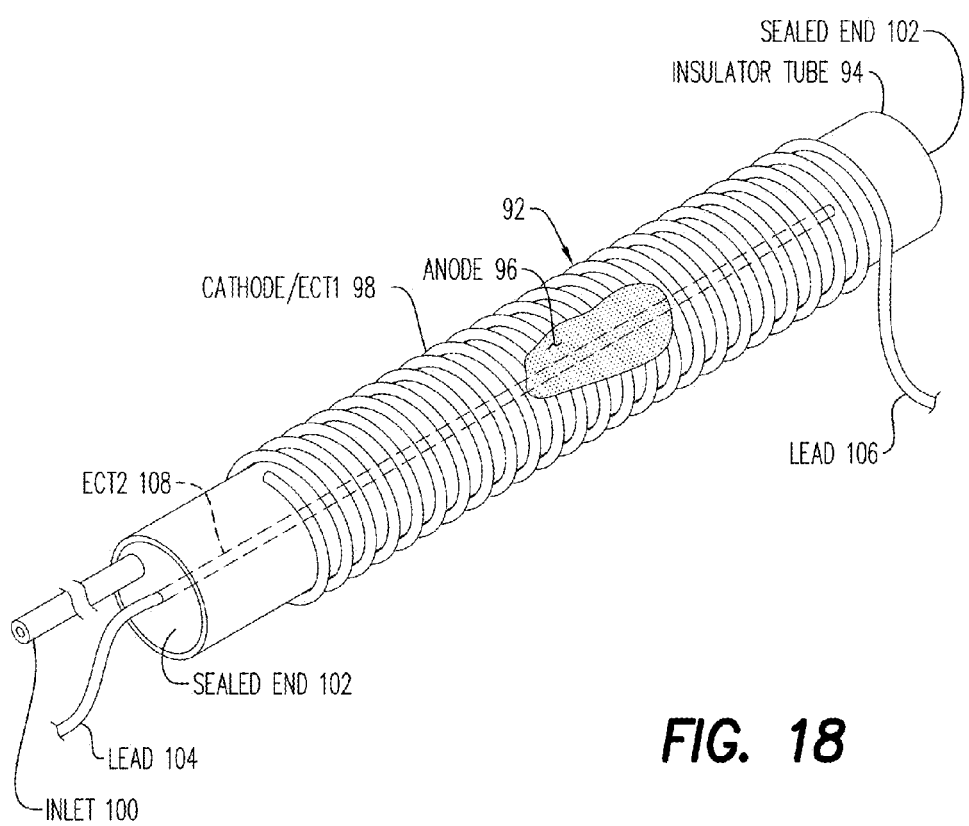

FIG. 18 is a perspective view of another embodiment of test cell 90.

Figure 19:
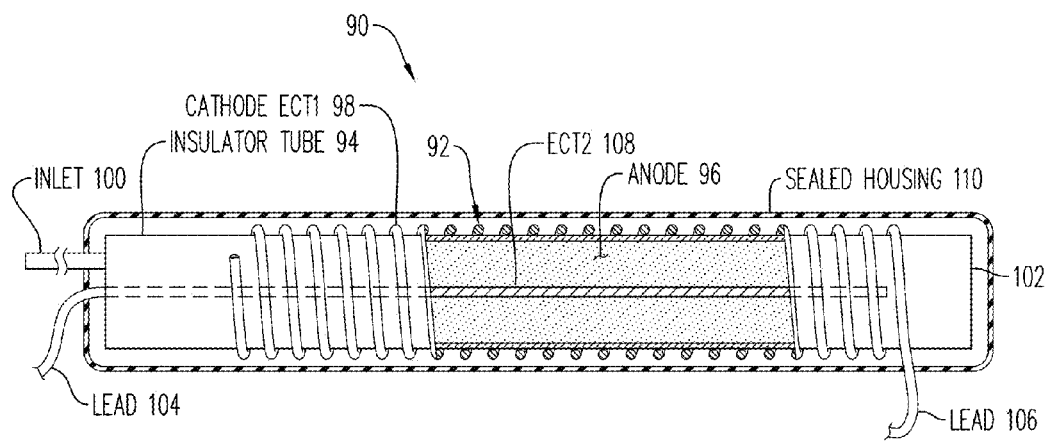

FIG. 19 is a side partial section view of FIG. 18.

Figure 20:
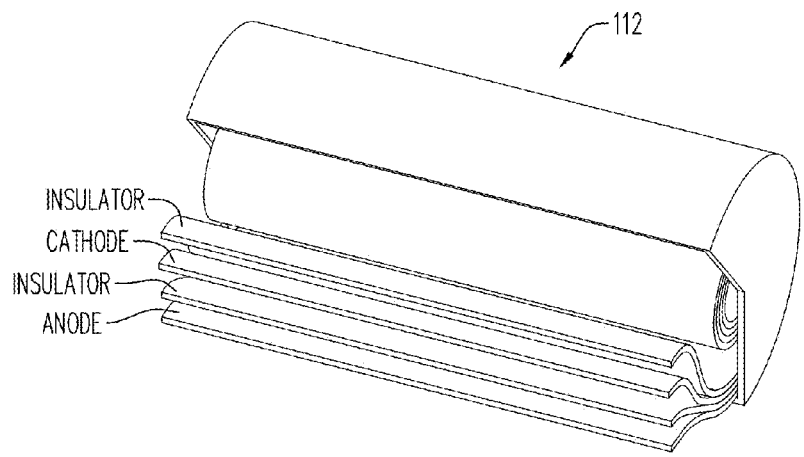

FIG. 20 is a perspective exploded view of another embodiment of test cell 112.

FIGS. 21A to 35B are graphic displays of linear cell resistance, open voltage, and current for cells II, III, IV, V, VI, VII, VIII, IX, X, XI, and XII in FIGS. 2B and 2C.

Exemplary embodiments are illustrated in reference figures of the drawings. It is intended that the embodiments and figures disclosed herein are to be considered to be illustrative rather than limiting.

DETAILED DESCRIPTION OF THE INVENTION

Nomenclature 10. test setup
12. linear test cell
14. elements of cell
16. non-conductive housing
18. non-conductive end cap
20. glass wool
22. gas inlet
24. lead
26. lead
30. cloud chamber
32. transparent bowl
34. dry ice
36. metal pan
38. sponge with alcohol
40. gas inlet
42. light source
44. leads
46. camera
50. elements of cell
52. anode
54. insulator
56. cathode
58. sealed housing
60. linear test cell
62. gas inlet
64. lead
66. lead
68. interior volume
70. linear test cell
72. elements of cell
74. anode
76. cathode
77. ECT1
78. ECT2
80. insulator
82. lead
84. lead
86. interior volume
90. tubular test cell
92. elements of cell 90
94. insulator tube
96. anode
98. cathode/ECT1
100. gas inlet
102. sealed ends
104. lead
106. lead
108. ECT2
110. sealed housing
112. spiral wrapped test cell Summary of Test Cells See FIGS. 2A-C

DESCRIPTION OF COMPONENTS OF CELL

ECT1: electron conductor connected to the cathode within a sealed housing, non-hydrogen absorbing;
ECT2: electron conductor connected to the anode within the sealed housing;
L1: electrical contact connected to ECT1 and extending from the sealed housing;
L2: electrical contact connected to ECT2 and extending from the sealed housing;
Insulator: material that impedes electron flow between anode and cathode;
Anode: hydrogen/deuterium gas absorbing material which releases ions and transmits electrons therefrom;

Cathode: a conductive non-hydrogen/deuterium gas absorbing material which collects ions;

Insulator Alternative: materials that act as electrical insulators, and based on testing may increase the longevity of the cells;

Semiconductor: material the conducts electricity more easily than insulators, but less easily than conductors.

Outline of Embodiments

I. Anode with hydrogen/deuterium
  a. Ionizes the hydrogen/deuterium gas
II. L2/ECT2/Anode/Insulator/Cathode/ECT1/L1 produce electrical conductivity.
  a. ECT (Electrically conductive terminal)
    i. ECT1
      Non-hydrogen absorbing electrical conductive material
      a. Examples—copper, silver, gold, tin, brass, iron, tungsten, lead, chromium, and alloys
    ii. ECT2
      1. Non-hydrogen absorbing electrically conductive material
        a. Examples—copper, silver, gold, tin, brass, iron, tungsten, lead, chromium, and alloys
      2. Hydrogen absorbing electrically conductive material
        a. Examples—nickel, lanthanum nickel, aluminum, platinum, palladium, titanium, and alloys
  b. L1 and L2
    i. Electrically conductive leads
  c. Anode
    i. Metals/materials capable of absorbing and splitting a hydrogen/deuterium gas molecule or producing a hydride
    ii. Material tested that produce voltage
      1. Examples—palladium, palladium salts, palladium oxide, lanthanum nickel, alloys
    iii. Material tested on or with a supplemental material resulting in a conductive material that produced voltage or expected to produce voltage
      1. Palladium material or hydrogen absorbing materials
        a. Examples—palladium, palladium salts, palladium oxide, lanthanum nickel, alloys
      2. Supplemental materials
        a. Examples—carbon, iron oxide, alumina, zeolite, nickel, palladium black, copper, titanium, lanthanum nickel, diatomaceous earth, alloys
    iv. Hydrogen-absorbing material thin film deposition or electroplated on a supplemental material
  d. Electrical Insulator
    i. Materials that do not readily conduct electricity
    ii. Materials that allow gas to pass through or around in the cell housing
  e. Cathode
    i. Non-hydrogen absorbing metals
      1. Examples—copper, silver, gold, tin, brass, iron, tungsten, lead, chromium, alloys
III. L2/ECT2/Anode/Insulator Alternative/Cathode/ECT1/L1
  a. L2
    i. See II. b.
  b. ECT2
    i. See II. a. ii.
  c. L1
    i. See II. b.
  d. ECT1
    i. See II. a. i.
  e. Anode
    i. See II. c.
  f Insulator Alternative
    i. Non-conductive materials
      1. Examples—lithium fluoride, lithium fluoride boron
  g. Cathode
    i. See II, e.
IV. L2/ECT2/Anode/Insulator/Insulator Alternative/Cathode/ECT1/L1
  a. L2
    i. See II. b.
  b. ECT2
    i. See II. a.
  c. L1
    i. See II. b.
  d. ECT1
    i. See II. a. i.
  e. Anode
    i. See II. c.
  f. Insulator
    i. See II. d.
  g. Insulator Alternative
    i. See III. f.
  h. Cathode
    i. See II. e.
V. L2/ECT2/Anode/Conductor/Insulator Alternate/Cathode/ECT1/L1
  a. L2
    i. See II. b.
  b. ECT2
    I. See II. a. ii.
  c. L1
    i. See II. b.
  d. ECT1
    i. See II. a. i.
  e. Anode
    i. See II. c.
  f. Conductor (electrical)
    i. Examples—copper, lead, tungsten, aluminum, tin, gold, silver, alloys
  g. Insulator Alternate
    i. See III. f.
  h. Cathode
    i. See II. e.
VI. L2/ECT2/Semiconductor/Anode/Insulator Alternative/Semiconductor/Cathode/ECT1/L1
  a. L2
    i. See II. b.
  b. ECT2
    i. See II. a. ii.
  c. L1
    i. See II. b.
  d. ECT1
    i. See II. a. i.
  e. Anode
    i. See II. c.
  f. Semiconductor
    i. Examples—silicon, germanium, aluminum nitride, copper oxide, lead sulfide, bismuth telluride.
  g. Insulator Alternative
    i. See III. f.
  h. Cathode
    i. See II. e.

VII. L2/ECT2/Semiconductor/Anode/Insulator Alternative/Cathode/ECT1/L1
   a. L2
      i. See II. b.
   b. ECT2
      i. See II, a. ii,
   c. L1
      i. See II. b.
   d. ECT1
      i. See II. a. i.
   e. Anode
      i. See II. c.
   f. Semiconductor
      i. See VI. f.
   g. Insulator Alternative
      i. See III. f.
   h. Cathode
      i. See II. e.
VIII. L2/ECT2/Anode/Insulator Alternative/Semiconductor/Cathode/ECT1/L1
   a. L2
      i. See II. b.
   b. ECT2
      i. See II.
   c. L1
      i. See II. b.
   d. ECT1
      i. See II. a.
   e. Anode
      i. See II. c.
   f. Semiconductor
      i. See VI. f.
   g. Insulator Alternative
      i. See III. f.
   h. Cathode
      i. See II. e.
IX. L2/ECT2/Semiconductor/Anode/Insulator/Insulator Alternative/Semiconductor/Cathode/ECT1/IL1
   a. L2
      i. See II. b.
   b. ECT2
      i. See II. a. ii.
   c. L1
      i. See II. b.
   d. ECT1
      i. See II. a. i.
   e. Anode
      i. See II. c.
   f. Semiconductor
      i. See VI. f.
   g. Electrical Insulator
      i. See II. d.
   h. Insulator Alternative
      i. See III. f.
   i. Cathode
      i. See II. e.
X. L2/ECT2/Semiconductor/Anode/Insulator/Insulator Alternative/Cathode/ECT1/IL1
   a. L2
      i. See II. b.
   b. ECT2
      i. See II. a.
   c. L1
      i. See II. b.
   d. ECT1
      i. See II. a. i.
   e. Anode
      i. See II. c.
   f. Semiconductor
      i. See VI. f.
   g. Electrical Insulator
      i. See II. d.
   h. Insulator Alternative
      i. See III. f.
   i. Cathode
      i. See II. e.
XI. L2/ECT2/Anode/Insulator/Insulator Alternative/Semiconductor/Cathode/ECT1/L1
   a. L2
      i. See II. b.
   b. ECT2
      i. See II. a. ii.
   c. L1
      i. See II. b.
   d. ECT1
      i. See II. a. i.
   e. Anode
      i. See II. c.
   f. Semiconductor
      i. See VI. f.
   g. Electrical Insulator
      i. See II. d.
   h. Insulator Alternative
      i. See III. f.
   i. Cathode
      i. See II. e.
XII. L2/ECT2/Semiconductor/Anode/Conductor/Insulator Alternative/Semiconductor/Cathode/ECT1/L1
   a. L2
      i. See II. b.
   b. ECT2
      i, See II. a. ii.
   c. L1
      i. See II. b.
   d. ECT1
      i. See II. a. i.
   e. Anode
      i. See II. c.
   f. Semiconductor
      i. See VI. f.
   g. Electrical Conductor
      i. See V. f.
   h. Insulator Alternative
      i. See III. f.
   i. Cathode
      i. See II. e.

Reference will be made to the particular test cell in FIGS. 2B and 2C and to the Summary of Test Cells above by making reference to the Roman numeral (e.g., I, II, III, etc.) associated with each cell type.

Figure 1:
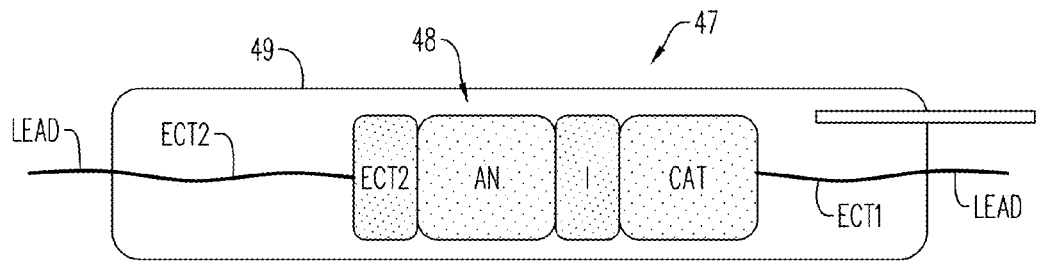
FIG. 1 is a general schematic sectional view of a general, exemplary embodiment of this disclosure.

Referring now to the drawings, and firstly to FIGS. 1, 2B, and 2C, a generalized test cell is shown at 47 in FIG. 1 and includes cell elements 48 positioned within a sealed housing 49. A gas inlet into the housing 49 provides for the controlled introduction of $D_2$ or $H_2$ into the housing 49 from an external pressurized source. The electrically conductive terminals (ECT) extend from each end of the cell elements 48. A key as to the nature and function of each of the cell elements 48 and all other elements showing by FIGS. 2B and 2C is shown in FIG. 2A, A complete summary of the cell elements of this disclosure is shown generally at 50 in FIGS. 2B and 2C. Each group of cell elements 50 is referred to therein by numerals I to XII and includes cell elements 50 whose nature and purpose corresponds to those shown in the key in FIG. 2A and will be described more fully herebelow.

Stage 1 Test Cells

Development of test cells during Stage 1 was directed to a novel LENR energy cell, but one that produced electrical power directly rather than excess heat as an energy end product. It was postulated that, as the gas was pulled into the anode, the electrons would be stripped from the gas and those electrons entering the electron field could be directed out of the anode and used to produce electrical power.

Figure 3:
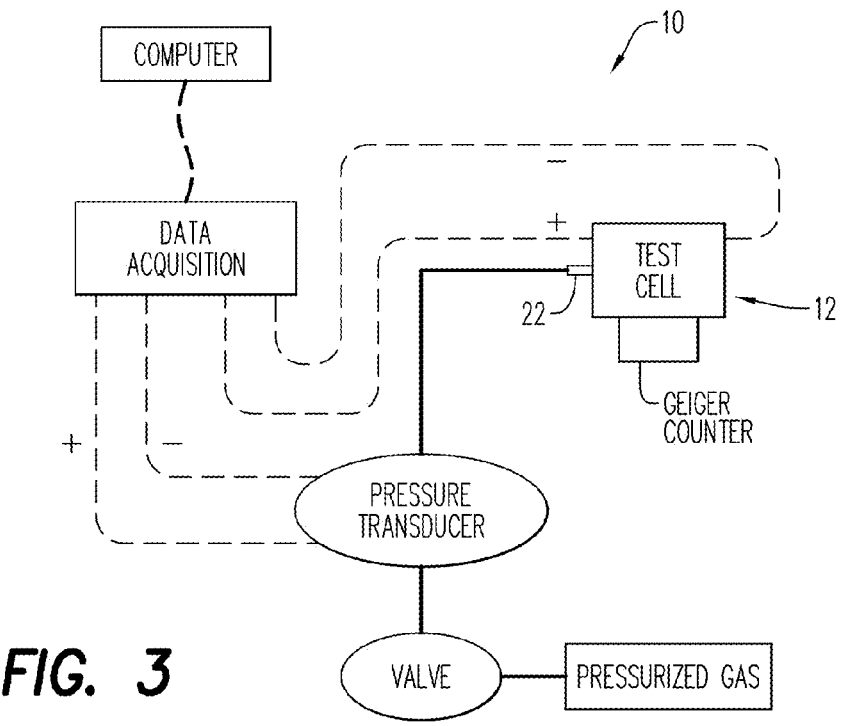
FIG. 3 is a schematic diagram of a system to initialize and operate test cells of this disclosure.

Referring now to FIG. 3, a test setup 10 for testing a test celL 12 in accordance with VI in FIG. 2B was constructed. The test setup 10 included a pressurized gas ($D_2$ or $H_2$) source for feeding gas under controlled pressure into the test celL 12 through gas inlet 22. A computer assisted data acquisition device acquired and processed operational data from test celL 12. Vacuum was first pulled on celL 12 from gas inlet 22 and data was collected for a period of time. Argon gas (25 psig) was then added and further data collected. Vacuum was pulled again, after which test celL 12 was pressurized with deuterium gas (25-50 psig) again, into gas inlet 22.

Figure 5:
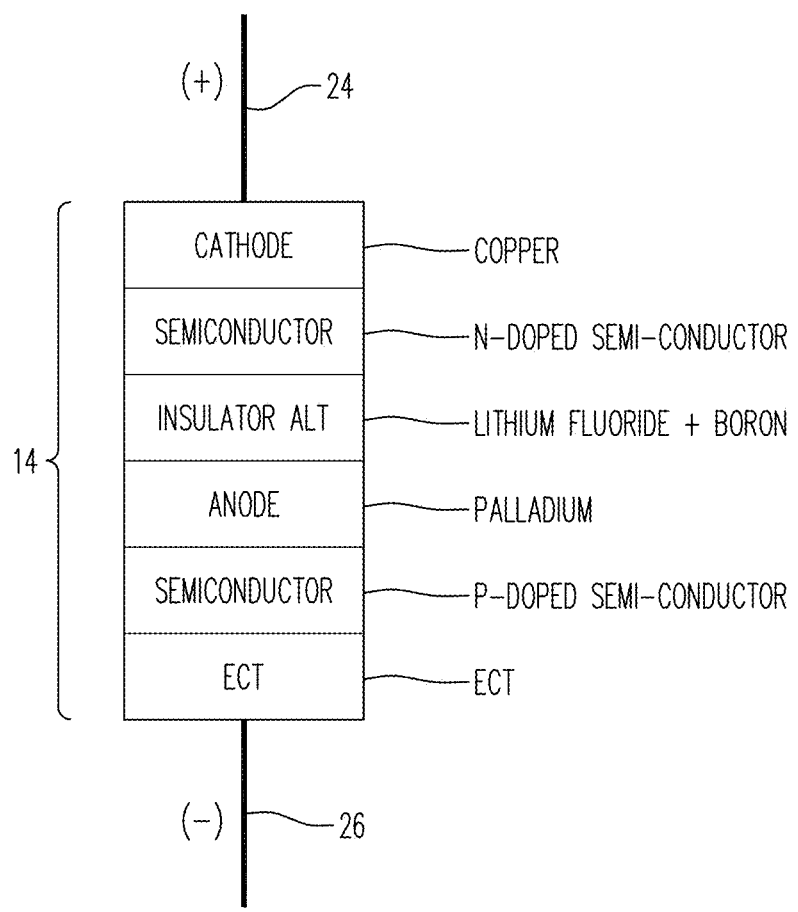
FIG. 5 is a schematic side view of element 14 of test cell 12.

Referring additionally to FIGS. 4 and 5, test celL 12 included a non-conductive sealed housing 16 formed from a plastic vial with sealed non-conductive end caps 18 and gas inlet 22 for gas flow. An electrically conductive copper pellet (ECT) with a lead 24 and 26 soldered thereto was positioned at each end of test celL 12, central elements 14 of celL 12 being shown in FIG. 5. The housing 16 was sealed to end caps 18 with epoxy. Testing results for these cells will be described later in this Specification. Cell elements 14 were formed from loose powder, or pellets formed by compressing the powder at approximately 35 k psi. The pellets were configured in the following formations:
1. Pressed individual powders into one complete pellet;
2. Pressed individual powders into separate pellets and stacked;
3. A combination of pellets and loose powder Testing results for these cells will be described later in this specification. The cells were tested as a single cell or as a stack of multiple cells. Cells were confined within a housing designed to seal and contain hydrogen ($H_2$) or deuterium ($D_2$) gas. Early cells were typically composed of a palladium (Pd) or nickel (Ni) material that was adjacent to semiconductors, with an ECT on either end.

Kilning

The palladium salts or oxides used in the test cells were taken and used directly from the vendor's bottle or were first heated in a kiln with or without supplemental materials. The determination to kiln was based upon the need for the decomposition of palladium salts to palladium metal to produce palladium crystals with a lattice structure to more effectively absorb the hydrogen/deuterium gas. The palladium salts or oxides were kilned with a supplemental material at various temperatures resulting in tiny palladium crystals and tiny strands of palladium metal attached to the supplemental material, as several of the palladium salts are known to dissociate at high temperatures, resulting in palladium metal.

Crucibles with various mixtures were placed in the Thermo-Scientific thermolyne kiln set at various temperatures and times. The kiln was pre-set to a temperature; the powders were measured out, mixed, and mortared and placed in a crucible with a lid. The crucible was placed in the kiln and heated; then removed and placed in a vacuum oven to cool. Cooling rates may be crucial to crystalline size or structure and may have impact on the results.

In the initial testing, the palladium material (nitrate, oxide, chloride) or palladium black was mixed with a 7:1 mass ratio to a supplemental material mortared together and placed in the pre-set kiln at temperatures ranging from 400° C. to 910° C. It was theorized that higher temperatures were needed to convert to the metal (>800° C.), but subsequent testing provided positive results with materials kilned ranging from 400° C. to 910° C. Subsequent testing was at 2:1 mass ratio. Neither 7:1 nor 2:1 are claimed to be the ideal ratios.

Kilning Under Gas

The kiln was pre-heated to 400° C. to 910° C. with an argon or carbon dioxide flow to prevent oxidation. Palladium salts or oxide was heated in the kiln for a period of three hours after which the kiln was turned off; the crucible remained in the kiln with $CO_2$ flow continuously until cooled. The crucible was then removed and placed in the vacuum oven for later use. The purpose of kilning was to thermally decompose the salt, and to leave behind the resulting metal. Different salts or salt hydrates and oxides decompose at different temperatures. The ideal temperature was not investigated; once a working condition was found it was continuously used.

Kilning with a Supplemental Material

To increase or sustain the electrical power experiments were done using a supplemental material combined with palladium metal, oxide, or palladium salts. The supplemental material was a conductive or a non-conductive material resulting in a conductive material with the palladium. The salts were mixed with the supplemental material which may provide a material for the palladium and/or may prevent oxidation while the mixture is in the kiln. A crucible containing a mixture of a palladium material and supplemental material was placed in a kiln, at a temperature sufficient to convert a portion of the palladium salt to palladium metal (400-910° C.). Thermally decomposable salts such as palladium nitrate, palladium chloride, and palladium acetate and hydrates thereof, palladium oxide, palladium black, and several other hydrogen absorbing salts were successfully tested. Wetted palladium nitrate mixed with the supplemental material and kilned (PdC) produced the best results to date.

Long Term Cells

Two cells were assembled; the first cell was reacted with deuterium gas only and the second cell was reacted with a mixture of hydrogen and deuterium gas. Both cells were of the following configuration, and held inside of a sealed glass housing The test cell that worked consistently included palladium nitrate hydrate+supplemental material kilned at 400° C. for three hours.

ECT2
Bismuth telluride P semiconductor (pellet from Hi-Z technology)
Palladium nitrate mixed with supplemental material (PdC) (kiln @ 400'C for three hours)
Lithium fluoride boron mixture (2:1 mass ratio)
Bismuth telluride N semiconductor (pellet from Hi-Z technology)
Copper
ECT1

The palladium, lithium and boron mixture, and copper were pressed into pellets. The bismuth telluride semiconductors were purchased as pre-manufactured pellets and chosen due to their good electrically conductive properties as compared to other semiconductors. These cells have maintained 500 mV-1000 mV for over 15 months. The cells were refilled with deuterium gas to <50 psig 3.5 months into the cycle (See FIG. 29C). For over 12 months the cells have produced over 500 mV, but very low current.

Palladium Nitrate ($PdNO_3$) Solution Variance

The two long-term cells were assembled with the last of the originally purchased palladium nitrate ($PdNO_3$ the material purchased is Pd $(NO_3)_2*6H_2O$) material obtained from Alfa Aesar. To repeat the experiment, more $PdNO_3$ was purchased from Alfa Aesar of the same lot and different lots; however, none of the material tested produced equal results to the first two cells. Once the initial bottle of $PdNO_3$ was consumed, months of testing failed to produce repeatable results equal to the original bottle of PdNO3.

After several months of failed testing, the solution presented itself: palladium nitrate is hygroscopic. The old bottle had been repeatedly used and exposed to humidity many times resulting in a salt containing liquid water, not just the molecularly bound water in the hexahydrate salt. Subsequent bottles and lots of $PdNO_3$ were then wetted, mixed with supplemental material, dried, and then kilned. This aqueous process again resulted in consistent and reproducible results.

Various voltage potentials were observed, depending on the palladium material. The standard test celL 12 that worked consistently includes PdC, the voltage potentials ranging from (−) 300 to (−) 700 mV per cell. The voltages are negative due to the way the leads 24 and 26 are connected into the data acquisition. The BiTe (P) side is placed as the positive (+) connection and the BiTe (N) is the negative (−) connection. If the potential voltage is negative (−), the electron flow is going toward the LiFB/BiTe (N) side.

Reversing the middle constituents (LiFB and PdC) produces a reverse polarity voltage under a deuterium atmosphere. The potential voltage reads positive 400 mV. The configuration is as follows:

ECT2/BiTe (N)/PdC/LiFB/BiTe(P)/Copper/ECT1

The assumption that the electrons were flowing from the LiFB to the PdC at this point in the development of the disclosure was later found to be incorrect. As later determined, the LiF and LiFB was found to be acting as an insulator alternative (I Alt), preventing electron flow, not as a source of electron absorption.

Cloud Chamber/Geiger Counter

Figure 7:
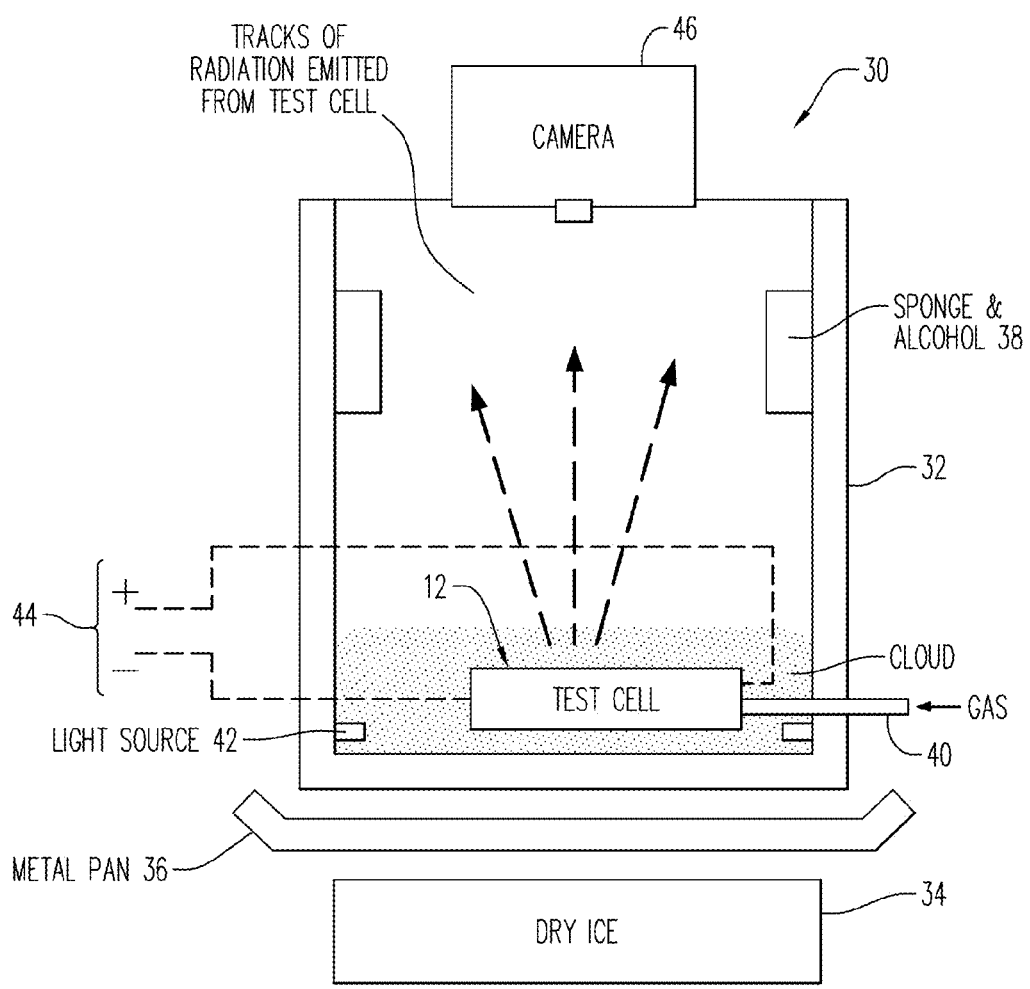
FIG. 7 is a side elevation schematic view of cloud chamber 30, used to visibly disclose tracks of radiation through a vapor cloud emitted within the chamber from the test cell.

Test cells 12 (referencing VI in FIG. 2C) were tested for radiation by using a Geiger counter showing in FIG. 3. On several occasions, a very sensitive Geiger tube was placed next to a running cell. Another powder cell was built around a Geiger tube. There were anomalies in the counts per minute (CPM), but the numbers were not sufficiently consistent or repeatable to draw any conclusions about the presence of an LENR from the Geiger testing. Another test celL 12 with deuterium flow was also tested in a cloud chamber as seen in FIGS. 7 and 8. Ionizing particles were observed exiting the surface of the palladium material, but not in sufficient numbers to quantify or account for the current produced by the cells.

Compositions

In Stage 1, lithium fluoride, boron, or a mixture of lithium fluoride and boron is compressed into a pellet or used as a powder as the cathode component. The lithium fluoride and boron are mixed in ratios of 2:1 by weight and mortared. These components did not produce an optimal reaction. As discussed more fully below, the boron. LiF and LiFB were found to be acting primarily as insulator alternatives preventing electron flow from the anode within the sealed housing.

I. Process of Cell Elements Formation

Test cells were assembled from loose power, or pellets formed by compressing the powder to approximately 35 k psi. Test cell pellets were pressed into 6 mm or 12 mm pellets for testing. The process of forming test cells from loose powder and pellets are discussed below. The pellets were configured in the following formations:
  a) Loose Powder
  b) Pressed individual powders into one complete pellet
  c) Pressed individual powders into separate pellets and stacked
  d) A combination of pellets and loose powder
  a) Loose powder
    i. Process
      1. Cut out copper foils (sized to internal chamber)
      2. Solder copper wire to outwardly facing side of each ECT
      3. Place one ECT for the base in the housing
      4. Measure out the individual powders and pour each layer into the housing
      5. Clean/swab internal walls of powder residue after each layer is added until all components are stacked while preventing mixing
      6. Place second ECT on top of powder; compress and seal chamber
    ii. Problems that occurred
      1. Surface contacts were not ideal between each layer of the cell; slight mixing of powders occurred causing electrical shorts
      2. Contamination in the housing from pouring powders and mixing of layers
      3. Inconsistent data; replication was minimal
      4. Variations in resistance between cells were seen due to packing
  b) Pressed individual powders into one complete pellet
    i. Process
      1. Measure out copper powder; pour into die
      2. Clean/swab the interior of die; use dowel to flatten layer
      3. Measure out component layer; pour into die
      4. Repeat above steps until all layers are in die
      5. Press the pellet to 35 k psi
      6. Remove pellet
      7. Solder copper wire to both ends
    ii. Problems that occurred
      1. Palladium material absorbing the deuterium gas heated and expanded causing breaks and fractures at the interfaces of the cell. This was later solved by diluting the palladium salt with supplemental material.
      2. LiF pellets did not consistently maintain structure when pressed as one individual pellet 3. Inconsistent data occurred; replication was minimal
c) Pressed individual powders into separate pellets and stacked
   i. Process
      Measure out copper powder; pour into die; press 35 k psi to form ECT
      1. Remove ECT
      2. Solder copper wire to an outer side of ECT
      3. Measure out the component individual powder; pour into die
      4. Press the pellet to 35 k psi; remove pellet
      5. Repeat above steps until all pellets for configuration are complete
      6. Stack the individual pellets following the configuration
   ii. Problems that occurred
      1. Surface contacts were not ideal between pellets when stacked
      2. Inconsistent data; replication was minimal
      3. Anode and cathode; later known as insulator alternative pellets did not consistently maintain structure when pressed
d) A combination of pellets and loose powder
   i. Process
      1. Measure out copper powder; pour into die; press 35 k psi to form ECT
      2. Remove ECT
      3. Solder copper wire to outside of ECT
      4. Clean/swab die after each use of different powders
      5. Measure out the component individual powder; pour into die
      6. Press the pellet to 35 k psi; remove pellet
      7. Measure out loose powder and pour into the housing over pellet
      8. Place second ECT over the loose powder; compress and seal chamber
   ii. Problems that occurred
      1. Surface contacts were not ideal between each layer of the cell; slight mixing of powders occurred causing electrical shorts
      2. Contamination in the housing from pouring powders and mixing of layers
      3. Variations in resistance between cells were seen due to packing
      4. Surface contacts were not ideal between pellets and powders when stacked
      5. Inconsistent data; replication was minimal Example 1

Figure 6A:
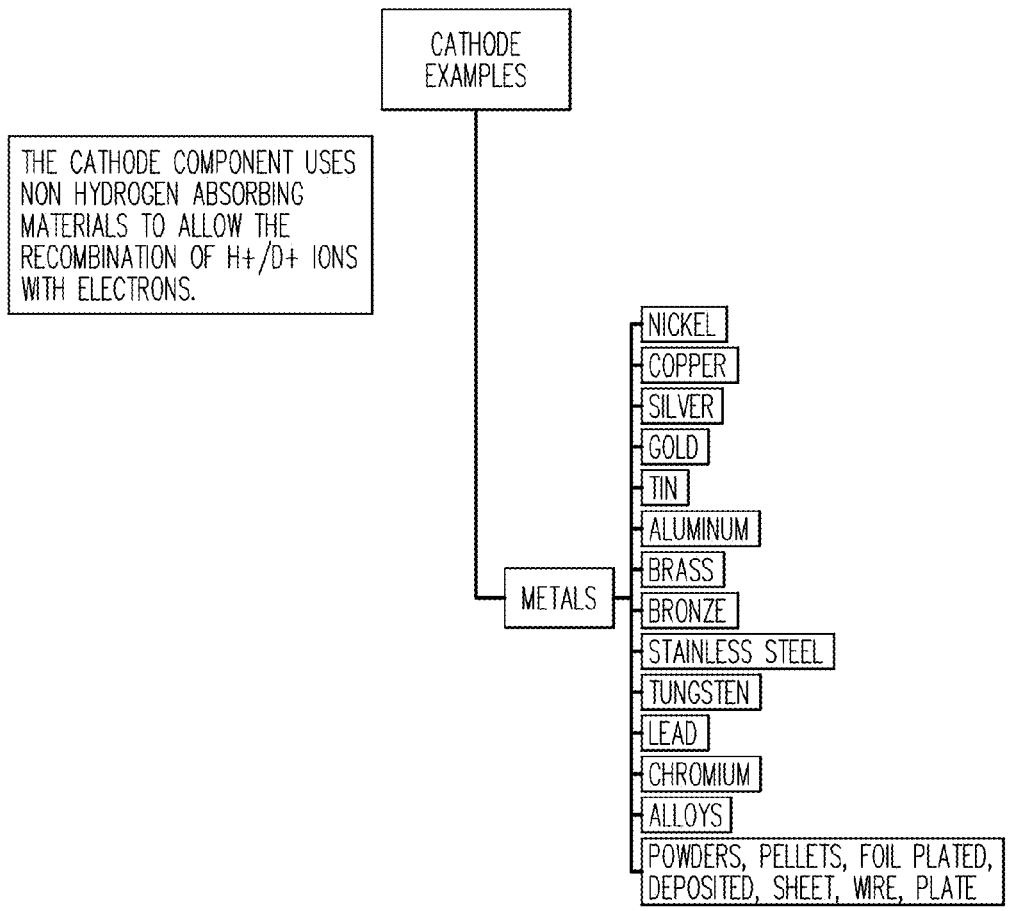
FIG. 6A is a block diagram showing known alternative or substitute materials for the cathode.
Figure 6B:
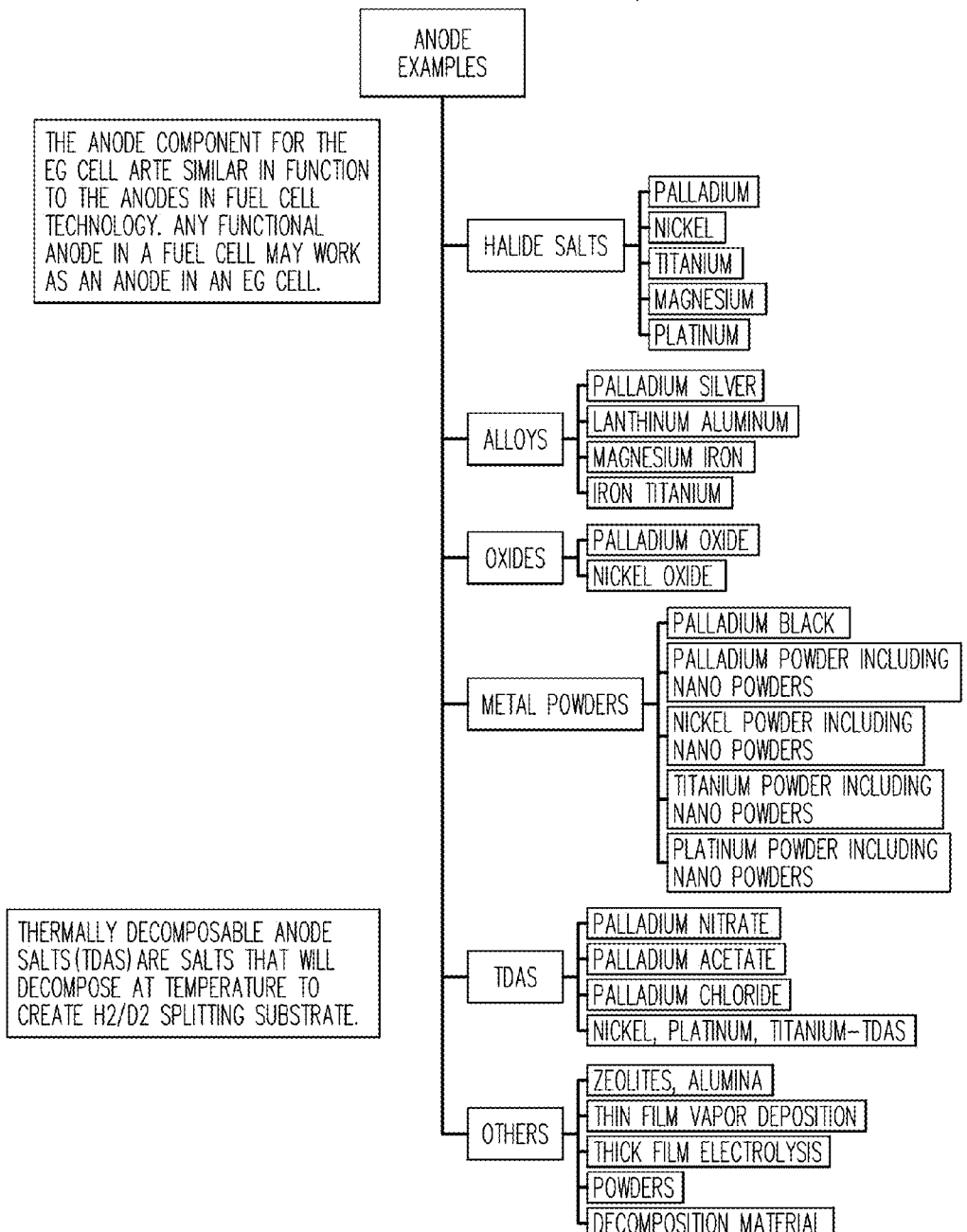
FIG. 6B is a block diagram showing known alternative or substitute materials for the anode.

Test cell 12 has various configurations that produce some electrical power. Removing either the anode or cathode from this configuration produces little to no potential voltage under deuterium gas. Reversing the semiconductors did not change the polarity of the cell. Removing the semiconductors did not affect the cell's ability to produce external power. Later it was learned that the LiF/LiFB cathode could be removed if an insulator and a copper cathode was added; the cell produced electrical power. FIGS. 6A and 6B outline the range of cathode and anode materials capable of splitting $H_2$ or $D_2$.

Example 2

A multiple unit of seven test cells 12 of a single cell composition were placed in a stack formation together; voltage of at least 3.5 volts was achieved. The single cell has two copper ends (ECTs); the multiple unit also having two ECTs, one on either and of the multi-cell, this single composition being as follows:
ECT1
Copper/BiTe (N)/LiFB/PdC/BiTe (P)/repeated
ECT2
The multiple unit of seven cells exhibited approximately 0.6 µA at a resistance load of 150 kΩ for a period of less than a day. The electric generator composed of the seven cells was able to briefly illuminate an LED (light emitting diode).

The volume of the components was nearly the total empty volume of the cell. This minimizes the interior volume once the cell was built. It was later learned that a great deal of excess open interior volume is detrimental to the production of electrical power, perhaps as a result of a dilution effect of the D+ ions in the gas.

Example 3

Other testing protocols were developed to understand the increase in potential voltages when $D_2$ gas is introduced into a single cell. A cloud chamber (See FIG. 7) was devised to visualize any radioactive particles being emitted from the operating cell and pellets of the various materials. The test cell was placed open to the air into a copper fitting with a tube for gas flow. The cell did not show any significant particle count under vacuum or argon pressure. As seen in FIGS. 8 and 9, there were occasional ionizing particles emitted from the testing materials under deuterium or hydrogen flow. There were single cells that demonstrated an increase in particle count, temperature and voltage as the cells were pressurized with $D_2$ gas. The testing was very difficult to reproduce and not conclusive.

Example 4

A Geiger counter and a Geiger tube (M4011) (see FIG. 3) was placed directly next to a single cell unit and sealed for gas pressure. The Geiger tube was connected to a circuit that was able to calculate the counts per minute as a data acquisition device recorded open voltage. The cell did not show any significant increase in counts under vacuum or argon. The counts per minute did increase as $D_2$ gas is introduced to the cell for a period of time. The best results occurred when a loose powder cell was constructed tightly around a Geiger tube within the sealed housing. The correlation between radiation, temperature and voltage has not yet been determined. The testing was very difficult to reproduce and is not sufficiently conclusive to support a conclusion that ionizing particles were being produced.

Example 5

Replication of the single and multiple cell units was unsuccessful when the original bottle of the Alfa Aesar $PdNO_3*6H_2O$ was used entirely. Many cells were built with multiple lots, including the same lot of $PdNO_3$ purchased new from Alfa Aesar. Those cells were tested without success over a period of several months. It was recalled that the $PdNO_3$ in the original long term cells was wet because the material was old and had absorbed water from the atmosphere. It was theorized that the wet $PdNO_3$ produced a different material when kilned with the supplemental material than did the newer lots of dry $PdNO_3$. The dry $PdNO_3$ was dissolved into DI water and mixed thoroughly with supplemental material. The wetted mixture was dried in the kiln at 110° C. for one hour, then kilned at 400° C. for three hours. This cell repeatedly produced electrical power similar to the long term cells.

Example 6

In an attempt to increase electrical power, materials were altered and the size of the cell was changed. Assuming that the reaction was occurring at the interface of the palladium and LiFB, the diameter of the cell was increased: more surface area should result in more current at the same voltage resulting in more power. However, with the same or even double the amount of material in a cell of double the diameters, the resultant power was significantly less. Doubling the diameter produces four times the surface area, and should result in four times the current and reduced the thickness of the LiFB layer. Unexpectedly, a thinner layer of LiFB with more surface area produced less power.

Example 7

Unexpectedly, a thicker layer of LiF produced more current, while a very thin layer did not work at all. This was contrary to expectation because a thinner layer produced less resistance through the cell under vacuum. During the testing, the boron was removed with no negative effects, then both semiconductors were removed with no negative effects. The resulting new cell configuration is:

ECT2/PdC/LiF/Copper/ECT1

Because the thickness of LiF layer impacts the resulting electrical power, it was postulated that the thickness of the layer somehow interacts with the LENR components. In retrospect, the reason for these results seems to be based on thicker layer of LiF becoming an insulator.

Example 8

As the hydrogen or deuterium gas flows into the housing, a great deal of heat is generated as the palladium absorbs the gas. Cells typically reach temperatures above 100° C., but the heat is short lived. As the palladium absorbs the gas, the palladium expands. This expansion can cause fractures or cleaving of the palladium pellets, especially when multiple materials were pressed into one pellet. These fractures were considered at the time to be potential causes for the erratic voltages observed in the early cells. The cleaving of the pellets was solved by diluting the palladium component with supplemental material and by making individual pellets and epoxying the sides together instead of sintering all the layers together. PdC did not get as hot as did the palladium black material when exposed to the deuterium/hydrogen gas. The expansion of the PdC was also reduced. The addition of supplemental material prevents the fractures and limits the amount of heat generated during the loading process, acting as a heatsink.

As the palladium material absorbed the hydrogen/deuterium gas, the pressure in the cell decreased. A great deal of heat was generated during the initial loading step. The cell was allowed to cool, then loaded again with more gas. The heating and cooling cycle took approximately 15 minutes, depending on the mass of the cell components. The palladium material often took several cycles to be completely filled with deuterium. Literature searches typically show 0.6 moles deuterium to one mole palladium as fully loaded. Many LENR papers claim higher loading densities. Complete loading in this testing was ascertained to occur once the cell maintained gas pressure.

Findings of Stage 1

Palladium, Nickel, etc. components kilned under $CO_2$ or Argon prevented oxidation.

Thermally decomposable Pd/Ni salts kilned under $CO_2$ or Argon prevented oxidation of the byproducts.

Palladium, Nickel, etc. components kilned with carbon prevented oxidation of the byproducts.

Thermally decomposable Pd/Ni salts kilned with carbon prevented oxidation of the byproducts.

Kilning dry $PdNO_3$ salt vs. a $PdNO_3$ wetted with water and kiln-dried on a supplemental material that produces a conductive mixture produces a different material.

Reproducibility of test cells was due to the difference in wetted $PdNO_3$ vs. dry $PdNO_3$ kilned.

In individual cells, boron reduces power. (Retrospectively, boron is conductive, and the addition of boron was reducing the electrical insulation properties of the LiF.)

In individual cells, bismuth telluride semiconductors are producing more power than CuO.

Individual cells are connectable in series; however, when stacked, multiple cells in the same tube seem to interfere with each other producing less than expected power from the series.

More tightly compacted cells seem to produce more power.

Thickness of the layers has an impact on cell output.

Stage 2

In an attempt to understand the LiF/LENR interaction, different materials were placed between the PdC and the LiF layers to block different types of radiation. A metal foil placed between the layers had no impact, while the thickness of the LiF layer still impacted the cell with the foil. A sheet of paper of any thickness impacted cells. It was learned that paper prevented electrons from flowing internally in the cell. The electron flow in the system, only external to the cell, is explained further below.

Fuel Cell-Like Theory

Initially, it was assumed that cells of this disclosure would generate electrical voltage as a result of an LENR reaction. This theory was further supported when the addition of the lithium and boron component helped to stabilize the cell. As the testing progressed, however, the results directed operating assumptions towards a new type of fuel cell—a fuel cell absent a constant supply of fuel and devoid of a known ion transport mechanism.

Aspect of Operation

Although the actual mechanism is unknown, the following the proposed to describe how the cell works. FIG. 10 shows a schematic section view of element 50 of test cell 60, corresponding to test cell II. The cell element 50 includes a Pd anode 52, a copper cathode 56, and a paper insulator 54, therebetween. Test cell 60 includes a sealed non-conductive housing 58 having a gas inlet 62 sealingly connected in fluid communication with the interior volume of the housing 58. Conductive leads (also acting as ECTs while in the interior volume) 64 and 66 are connected to anode 52 and cathode 56, respectively, and extend from the interior volume to the exterior of housing 58.

In FIG. 10, when $D_2$ begins to flow under pressure (about 30 psig) through gas inlet 62 into housing 58, palladium begins to absorb the $D_2$. Once housing 58 and palladium anode 52 are filled as indicated by no further pressure change, gas flow is stopped. The $D_2$ enters palladium as two deuterons ($D^+$) and two electrons ($e^-$) as depicted in FIG. 11. Deuterons ($D^+$) move in the palladium lattice, and electrons ($e^-$) become part of the overall electron field of the palladium/$D^+$ alloy (See FIG. 14).

In FIG. 11, as palladium fills with deuterium (deuterons and electrons), there is a net neutral charge on the material. For every deuteron, there is an electron as shown in FIG. 11. The electrons ($e^-$) are shown associated with the $D^+$, but in reality, the electrons are in the electron field of the alloy (Pd/D alloy).

In FIG. 12, palladium reaches equilibrium with the gas. As more $D_2$ is absorbed, something must leave the palladium. The components leaving exit sometimes as $D_2$ and sometimes as $D^+$. The palladium anode contains a great deal of deuterium ($D_2$) within its lattice, but any deuterons ($D^+$) escaping the anode leave behind their once associated electron. To the contrary, any $D_2$ escaping will remove two deuterons and two electrons from the anode. It may also be possible for a deuterium molecule to combine with a deuteron to form a diatomic molecule with a net +1 charge.

In FIG. 13, as the palladium matrix loses deuterons, the palladium develops a net negative charge, but wants to be neutral. In equilibrium, $D_2$ is being pulled into the palladium. $D_2$ gas is evolved. $D_2$ is being pulled into the palladium and $D^+$ is being evolved. This exchange is ongoing and is the equilibrium state of the system.

In FIG. 14, the gas in the interior volume of housing 58 contains both deuterium ($D_2$) and deuterons ($D^+$) dispersed throughout the cell. Insulator 54 blocks the transfer of electrons ($e^-$) between anode 52 and cathode 56, but will allow ions ($D^+$) to freely transport therethrough and around the cell elements.

In FIG. 15, lithium is replaced with copper cathode 56. Once paper insulator 54 was inserted and the half-cell reactions test gave unexpected results (see FIG. 13 below), further testing and retrospective analysis of past tested cells lead to the conclusion that the lithium was merely acting as an insulator alternative. That hypothesis was tested by removal of the lithium and replaced by copper as the cathode. The copper cathode produced the same results with or without the lithium if the cell contained an electrical insulator.

These results led to the production of a cell containing a PdC anode 74, copper cathode 76 with paper therebetween as electrical insulator 80 as shown in FIG. 16. The leads 82 and 84 were connected between ECTs 77 and 78 and an ohmmeter. As $D_2$ is flowed through gas inlet 88 into sealed housing 82 containing PdC 74, the interaction between the $D_2$ gas and PdC anode 74 caused a phenomenon that allows the gas to conduct electricity as above described. Cells containing:

PdC/Insulator/Copper with ECTs on either end had resistance above >200 MΩ under vacuum or argon and then dropped to <5 MΩ as $D_2$ was introduced (see FIG. 21A below). Cells built without the palladium did not change resistance. Addition of hydroxide components on the copper anode side also prevented the reduction of the electrical resistance.

Note importantly, as shown in FIG. 14, that two alternative or combined pathways for ion ($D^+$) flow are provided. If insulator 54 is sufficiently porous, ions ($D^+$) produced within anode 52 will flow through insulator 54, stressing that the primary function of insulator 54 is to prevent electrons ($e^-$) from flowing between anode 52 and cathode 56. Thus, electrons ($e^-$) can only flow out from anode 52 through lead 64.

The second pathway for ion ($D^+$) flow is through a gap provided between insulator 54 and housing 58 which will provide for more complete absorption of ($D^+$) ions into cathode 56, producing greater electrical power thereby.

Findings of Stage 2

$D_2$ gas injected into a sealed housing containing palladium produces an ionized gas.

The lithium (LiF or LiFB) component was not necessary to produce electrical power in the cell.

As the D+ exits the PdC, the PdC is left net negatively charged.

The copper material allows the recombination of deuterons and incoming electrons.

The thickness of the lithium component has an impact on cell output unless an electrical insulator is added.

Electrons want to move from the anode to the cathode to neutralize the cell internally, but the electrical insulator prevents the internal transfer of electrons.

Leads externally connecting the two sides permit the flow of electrons externally.

A change in temperature may have an effect on the cell, specifically the loading of gas into palladium and the release of ions. A hot or cold loading or a temperature change after the cell has been loaded could impact electrical generation, Oscillation of temperature may also be beneficial.

A change in pressure may have an effect on the cell, specifically loading gas into palladium and the release of ions. A higher or lower pressure loading or a pressure change after the cell has been loaded could impact electrical generation. Oscillation of pressure may also be beneficial.

Example 9

Different materials were tested between PdC and LiF components. The purpose of this testing was to block different types of radiation and determine the impact on the LENR electrical power production (see FIG. 17). Metal foil, plastic, glass wool and paper were tested. A metal foil was tested between the layers and found to have no effect on voltage output, but the thickness of LiF still impacted cell output. The cell was then tested for resistance, the test results described more fully herebelow. Resistance with the metal foil was high (depending on the LiF thickness) until deuterium was introduced. With paper between the layers of PdC and LiF, the cell had no means for conducting electricity. In vacuum and then argon, the measured resistance was very high as expected (200 MΩ as measured on a megohmmeter). However, the resistance of the cell containing deuterium was unexpectedly less than 5 mΩ.

Example 10

Cells containing several sheets of paper >4 mm thick, under vacuum and argon, were tested using a megohmmeter and resistance was over 200 MO. The cells were then transferred to a meter with a maximum resistance of 60 MΩ that could be connected to a computer for data acquisition. As deuterium or hydrogen flowed into the cells, resistance dropped rapidly from >60 MΩ to <5 MΩ (see FIGS. 21A, 23A, 24A). With or without LiF on the opposite side of the paper, resistance dropped and maintained low resistance.

Example 11

A cell containing lithium iodide and PdC was tested for voltage. Upon introducing $D_2$, the insulator adjacent to the lithium iodide was partially stained dark brown. This staining is consistent with iodine staining. It is very difficult to split a lithium iodide salt. After operating over 1,500 cells, the only brown staining was seen with the few cells containing lithium iodide. With palladium contained within the cell, as $D_2$ is introduced, a species is produced in the gas that is capable of splitting the Li—I bond. It is postulated that a $D^+$ or $H^+$ ion is produced and the species is responsible for splitting the Li—I bond, leading to a possible means for purifying a lithium salt.

Example 12

Hydroxides included as components in cells kill the cell (i.e., the cell does not produce voltage/current, nor will it conduct electricity). Temperature in the cell with the addition of deuterium was also higher in LiOH. Carbonate and other basic species would be expected to produce the same results.

Example 13

Cells were assembled with the following configuration: ECT2/PdC/Insulator/LiF/Copper/ECT1

By adding paper as an insulator, the cell was further stabilized. Cells were tested with different thickness of LiF and thickness had no impact on the cells containing an electrical insulator. As a result of the electrical insulator negating the LiF thickness impact on the cells, different cathodes were tested in the system with PdC as the anode, LiF, NaF, KF, $ZnF_2$, $AlF_3$ were all tested. Based on the different half-cell potential voltages, it was expected that changing the cathode would produce significantly different overall cell voltages. For example: The lithium half-cell potential is over two volts greater than that of zinc. Unexpected results from the Li, K. Na, Zn, and Al: each compound produced similar open voltages of 300 mV to 400 mV. Zn and Al produced a maximum initial voltage of 760 mV and 628 mV, respectively, but over time, the voltage reduced.

The voltage produced in an electrochemical cell during the oxidation/reduction reaction of dissimilar metals can typically be broken down to two half-cell reactions, an oxidation half-cell reaction and a reduction half-cell reaction. The difference between these two half-cell voltages determines the voltage of the system.

Below are the standard half-cell potentials for several common metals:

| Cathode (Reduction) Half-Reaction | Standard Potential E° (volts) |
|---|---|
| $Li^+(aq) + e^- \rightarrow Li(s)$ | −3.04 |
| $K^+(aq) + e^- \rightarrow K(s)$ | −2.92 |
| $Na^+(aq) + e^- \rightarrow Na(s)$ | −2.71 |
| $Al^{3+}(aq) + 3e^- \rightarrow Al(s)$ | −1.66 |
| $Zn^{2+}(aq) + 2e^- \rightarrow Zn(s)$ | −0.76 |

The unexpected results of the half cells variation testing lead to the production of the cell configuration below:

ECT2/PdC anode/Insulator/Copper cathode/ECT1

The resulting cell produced electrical power.

Example 14

It was also learned that changing the cathode to other metals impacts the cells. If a metal is used that absorbs hydrogen or readily forms hydrides, the current in the cell will be significantly reduced. Aluminum (Al) and Nickel (Ni) metals, for example, produce opposite polarity open voltage to the copper. The Al and Ni also produced no measurable current under a 5 MΩ load.

Example 15

Cells each containing a PdC anode were tested. A cell wrapped with copper (See FIGS. 18-20) produced more power under a load than a cell with the copper wire simply running along one side of the cell. The wrapped wire was significantly longer and the extra length, surface area or mass may be the reason for the increase in electrical power. Other materials, copper foils for example, with greater surface area also increased the electrical power of the cell as long as the anode was the limiting factor.

Example 16

There is a relationship between total cell volume and volume of components (interior volume). Cells with less gas volume-to-material volume (interior volume) produced more power than did cells with a great deal of gas volume, which led to a theory of concentration of ionized gas. This was seen in both Stage 1 and Stage 2. This could further lead to pressure or temperature implications on cell power production.

Example 17

There is an indication that the cells are running slightly warmer than the environment. Several cells with thermocouples attached were found to be operating at 1° to 2° C. above ambient temperature. Changing the temperature of the cells after the cells have reached equilibrium changes the power output of the cells. A cell that initially produced ~2 mA, after several days decreased in current to ~200 μA at ~25° C. When the cell was then heated to a surface temperature of ~50° C., the current recovered to ~2 mA. As the cell was allowed to cool back to room temperature, the current decreased back to ~200 μA at ~25° C.

Example 18

$D_2$ produces a greater cell power output than does $H_2$, probably due to the extra neutron in the deuterium causing a different release mechanism from the palladium metal lattice. Tritium, having two neutrons, would be expected to react differently than hydrogen or deuterium, possibly further increasing cell power output.

Example 19

In a cell containing deuterium gas and PdC, the reacted gas was flowed from the cell under internal pressure into a graduated cylinder containing water and a universal pH dye. As the gas flowed into the solution, the straw colored solution discolored around the outlet of the tube to a blue color, indicating a high pH. The discoloration was not continuous, but was repeated with several different cells containing deuterium and hydrogen gas and PdC. The discoloration seems more intense if the gas is left in the cell even for a few hours. Cells that were removed from one of the data acquisition computers were also tested, the gas from these cells also discoloring this water to blue (higher pH). Testing $D_2$ or $H_2$ in this way caused no discoloration. This discoloration was unexpected, indicating the presence of ions and the possibility of another mechanism occurring within these cells. The discoloration was sporadic as gas flowed through the cell, and needs further testing.

Example 20

Cells were stacked (five individual cells) and produced surprisingly and unexplainable results. The configuration, ignoring the ECT ends, was as follows. The ECT2 contacts the PdC and ECT1 contacts the copper.
1) PdC/Insulator/Copper/Insulator
2) PdC/Insulator/Copper The difference was found to be that, in one of the sets of cells (1), the copper always contacted the PdC; in the other set of cells (2), there was paper between the PdC and the copper. Cell (1) produced electrical power similar to a single cell. Cell (2), surprisingly, produced voltage nearly double an individual cell, but the current increased tenfold. Stacking cells should add voltage, but not current. Placing cells in parallel should add current, but not voltage. During the testing, many of the standard electrical rules that apply to batteries do not seem apply to these cells.

Example 21

Cells were tested to try to determine how gas permeability may impact the cells.

TABLE 1

| | Sealed to Cell Housing | Not Sealed to Cell Housing | Produced Electrical Power |
|---|---|---|---|
| (1) Palladium Pellet | X | | Yes |
| (2) Palladium Pellet | | X | Yes |
| (3) Paper Insulator | X | | Yes |
| (4) Paper Insulator | | X | Yes |
| (5) Plastic Insulator | X | | No |
| (6) Plastic Insulator | | X | Yes |

It was learned that if a palladium pellet was sealed to the walls of the cell housing (Table 1, (1)) the gas would penetrate through the pellet and the cell produced voltage. Other cells were tested with paper or plastic insulators. With a paper insulator sealed or not sealed to the housing (Table 1, (3, 4)) the cells produced voltage because the gas was able to pass around and/or through the porous paper. Sealing the plastic insulator to the housing (Table 1, (5)) prevented the cell from producing electrical power because the plastic sealed to the housing prevented ions from flowing from the anode to the cathode. With the plastic insulator not sealed to the housing (Table 1, (6)), the gas and ions were allowed to flow around the plastic within the interior volume and the cell produced power. With the paper insulator sealed to cell housing (Table 1, (3)), the voltage was produced as the gas was introduced and forced to flow through the insulator. However the voltage was lower than with a cell containing a paper insulator not sealed to the cell housing (Table 1, (4)), cell (3) also lost voltage after a short period of time. This is likely due to the paper impeding gas flow within the cell.

Thus, when the ionic gas is trapped on the anode side and the non-ionic gas on the cathode side, the electrical output of the cell is adversely impacted.

When gas is introduced into either or both sides of the cell, the cell will operate to produce electrical power as long as the gas flows through the interior volume and/or insulator to reach and react with the anode to produce ions. However, if the insulator is sealed to the housing, the cell will not operate to produce electrical power regardless of where the gas is introduced into the interior volume unless the insulator is ion permeable. The variability of the permeability of the insulator impacts the production of electrical power, particularly when the gas is introduced into the interior volume in close proximity to the cathode.

Example 22

Cells tested with more surface area produced better results. A first cell having four 0.1 g PdC anode pellets produced more electrical power than did a second cell having one 0.4 g PdC anode pellet. The first cell had a copper screen between each pellet. The copper screen allows the PdC pellets to conduct electrons between the pellets and provides open space for free gas flow. This first cell produced approximately 646 mV, and 1.9 µA, while the second cell produced approximately 350 mV and 300 nA. Thus, a cell of the same mass of PdC, but more surface area, produced approximately six times more current.

Example 23

Several individual test cells were built, loaded with deuterium gas, and electrically connected in series and produced expected additive voltage. This system was connected to a capacitor for a time sufficient to charge the capacitor, after which time the capacitor was used to illuminate an LED, clearly showing that electrical power had been produced by the system to charge the capacitor. Capacitor charging and LED illumination were repeated several times.

Example 24

Two cells were fabricated including palladium nitrate hexahydrate mixed with magnetite ($Fe_3O_4$) and water to form anodes of the cells. One anode was kilned at 400° C. and the other at 815° C., after first being dried at 110° C. (Magnetite converts to hematite ($Fe_2O_3$) when heated above its curie temperature of 585° C.) In either case kilning at 400° C. will remove any entrained or bound water from all of the components and it is believed that a portion of the palladium nitrate is converted to palladium metal.

When the 400° C.—kilned anode cell was loaded with deuterium gas, the cell produced liquid water. Water droplets were visibly detected inside the glass tube; later, another identical cell made with a water indicating material (DRIERITE, a desiccant) and a color change was apparent after deuterium gas was introduced into the cell. The cell made with the 815° C.—kilned anode did not produce visible water or change the color of the DRIERITE. The removal of oxygen from the magnetite requires a great deal of energy and an available proton or deuteron, further suggesting ionization of the deuterium gas within the cell.

Both of these cells produced typical electrical power. Other cells assembled with carbon, iron powder, titanium power, and other supplemental material also produced electrical power using wetted palladium nitrate. Cells produced using larger starting particles of unwetted thermally decomposable palladium salts did not work as well as did the wetted palladium nitrate.

Example 25

It is postulated that palladium metal or palladium salt may be deposited as a coating over an underlying material to produce electric power with a minimum amount of palladium material, thus reducing overall cost of the cell. The deposition may be accomplished via various means such as by vacuum evaporation, electrolysis, sputtering, thermal decomposition, and the like.

Performance Testing

Resistance

The addition of either $H_2$ or $D_2$ gas was found to dramatically reduce the resistance measured across cell II during normal operation as described hereinabove. When this occurrence was analyzed further, it was determined to be an indication that the cell had begun to produce electrical power. The resistance testing therefore became another indication of the production of electrical power by the cell upon the addition of the $H_2$ or $D_2$ gas. Initially, the reduction of resistance was thought to be due to electrons passing internally through the cell, but upon further consideration of the non-conductivity of the insulator, the only possibility for the dramatic drop in resistance had to be a result of the cell producing electrical power flowing externally to the meter.

Multiple cells were built to test the resistance with and without $D_2$ or $H_2$ gas. The cell was placed into a sealed gas chamber. The copper ends were connected to a multi-meter to measure resistance. A megohmmeter was used to measure cell resistance. (A megohmmeter is an instrument used to measure insulation on wires for generators.) The maximum measurement used was 200 MΩ on the megohmmeter and 60 MΩ for data acquisition.

Resistance data was first measured under argon or vacuum, after which $D_2$ or $H_2$ was introduced into the cell. The resistance always was very high to begin the test but quickly dropped as the $D_2$ or $H_2$ gas was introduced. This was true except when LiOH was tested. It is postulated that the OH⁻ neutralized the ionization component.

Figure 21A:
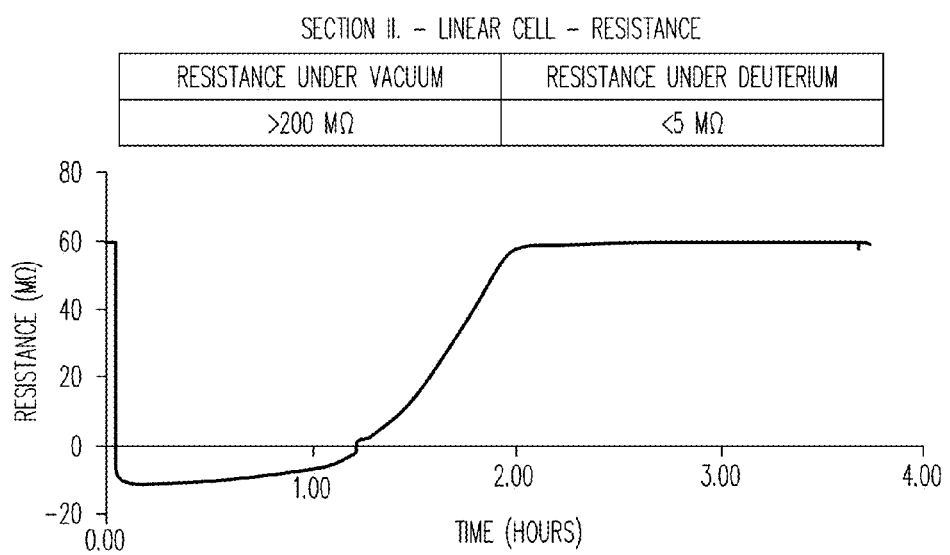
Figure 21B:
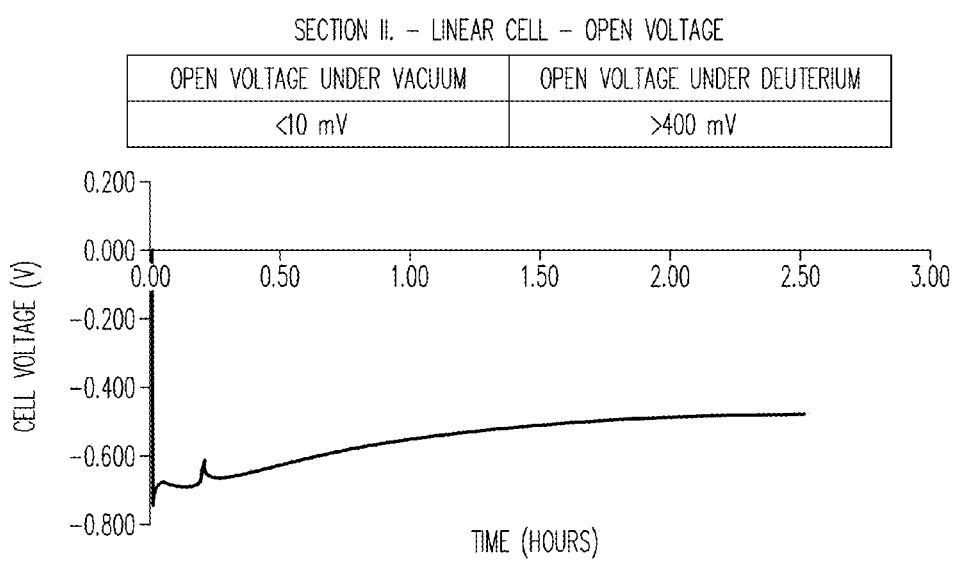
Figure 21C:
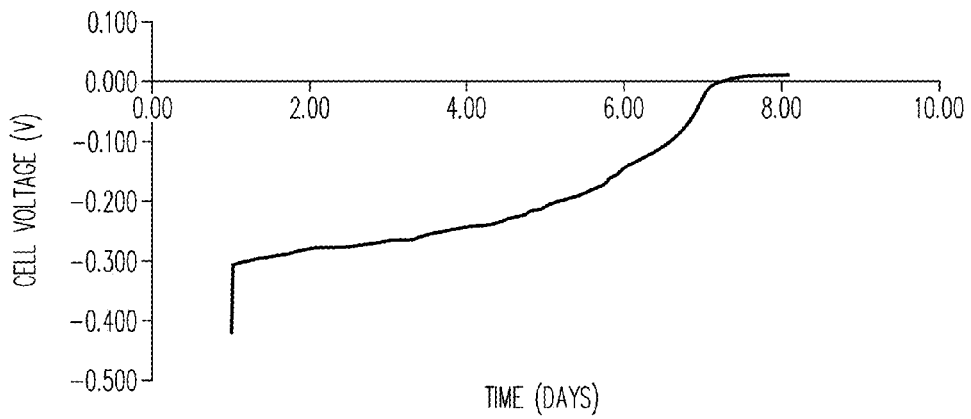

Referring to FIGS. 21A to 21C, the test cell was constructed in accordance with cell II with glass wool, between a copper connector and PdC, as an insulator. These cells were constructed utilizing loose powder. In FIG. 21A, after cell II is fully pressurized with $D_2$, the resistance of the cell dropped to below 5 MΩ for four hours. The resistance was over 200 MΩ prior to the test. In FIG. 21B, the open voltage of the cell was maintained over 550 mV for a period of over one day. In FIG. 21C, the voltage under a resistive load of 10 MΩ of the cell was initially near 300 mV and drained to near zero after seven days.

Figure 23A:
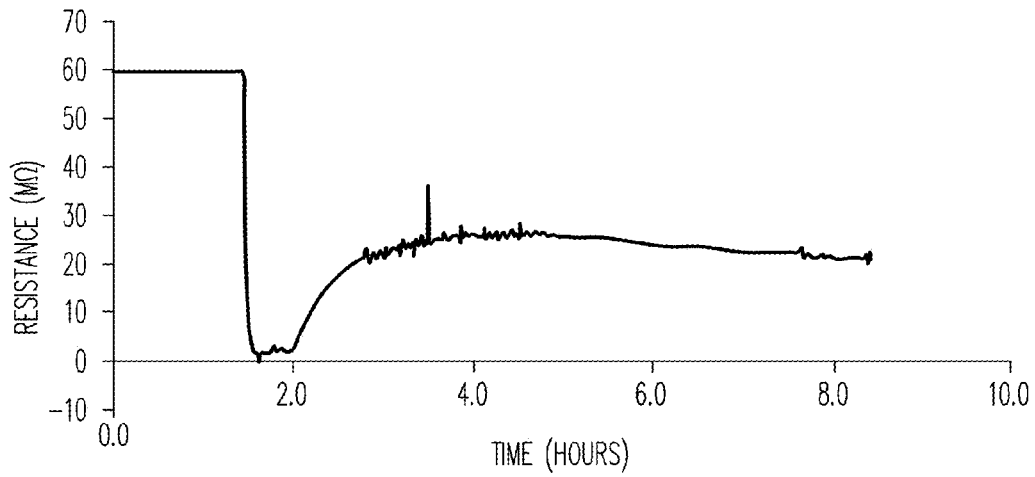
Figure 23B:
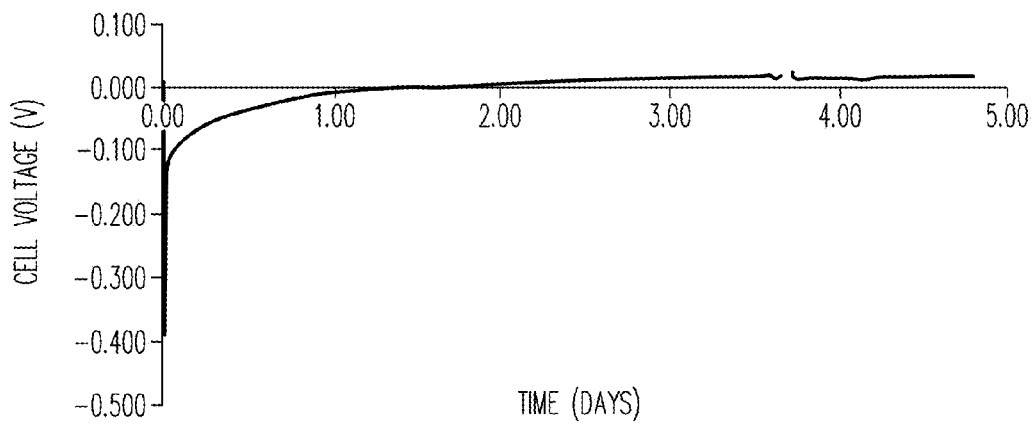
Figure 23C:
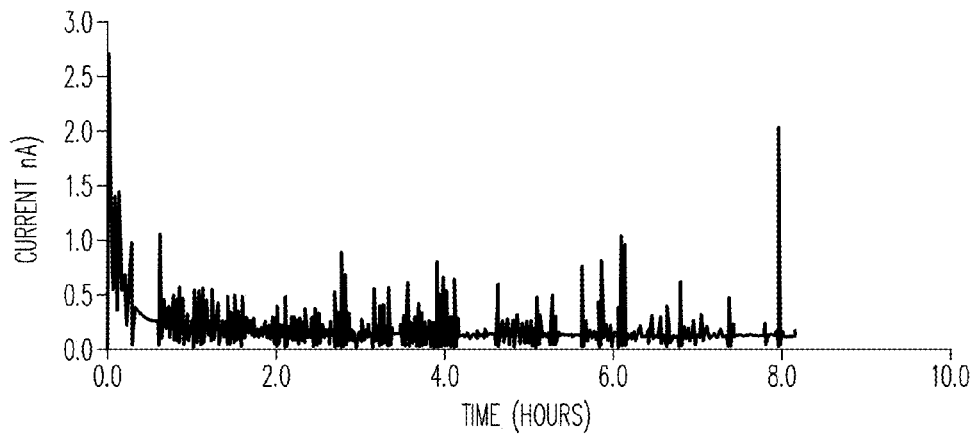

Referring to FIG. 23A to 23C, the test cell was constructed in accordance with cell III. In FIG. 23A, after cell III is fully pressurized with $D_2$, the resistance of the cell dropped to near 0 MΩ for one hour stabilizing at 20 MΩ after 14 hours. The resistance was over 200 MΩ prior to the test. In FIG. 23B, the open voltage of the cell was 375 mV stabilizing to 20 mV after one day. The voltage switched polarity after two days. In FIG. 23C, the current of the cell maintained very low current (in the 0.1 nA range).

Figure 24A:
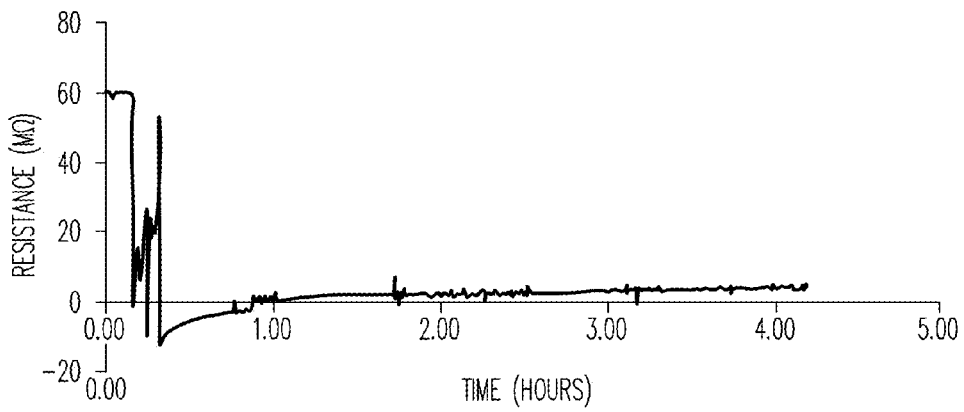
Figure 24B:
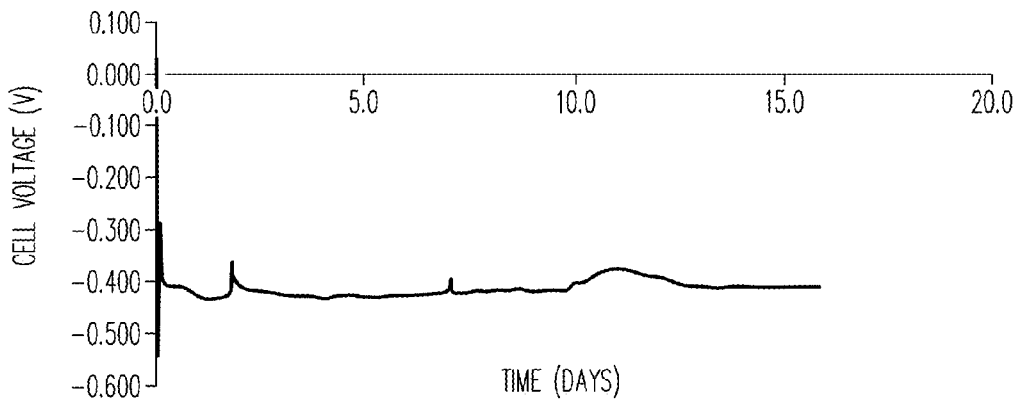
Figure 24C:
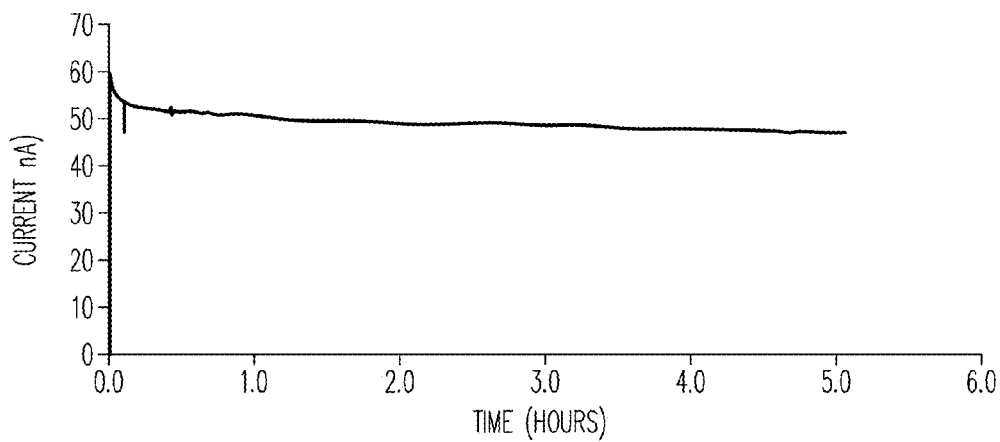

Referring to FIG. 24A to 24C, the test cell was constructed in accordance with cell IV. In FIG. 24A, after cell IV is fully pressurized with $D_2$, the resistance of the cell dropped to negative 10 MΩ stabilizing at 2-4 MΩ after 10 hours. The resistance was over 200 MΩ prior to the test. In FIG. 24B. the open voltage of the cell was 550 mV stabilizing to 400 mV after one day and maintained at 400 ml/for 15 days. In FIG. 24C, the cell's current maintained low current in the 55 nA range for a period of four hours.

Performance Testing

Resistance, Voltage and Current

Figure 22A:
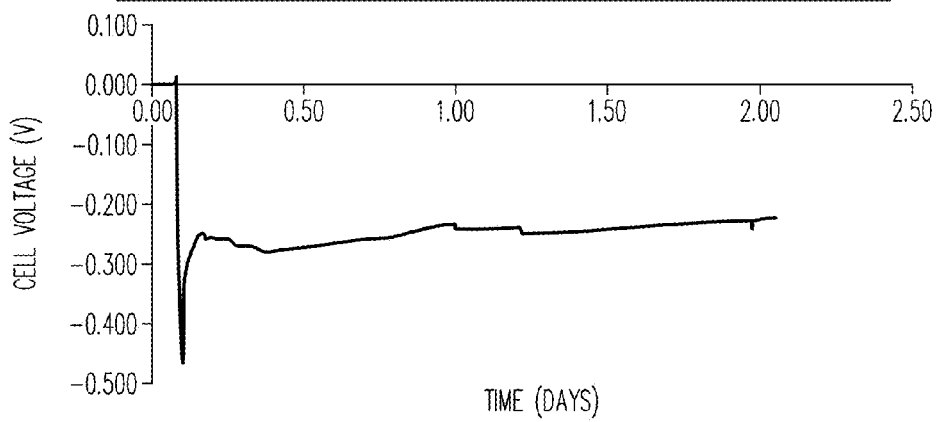
Figure 22B:
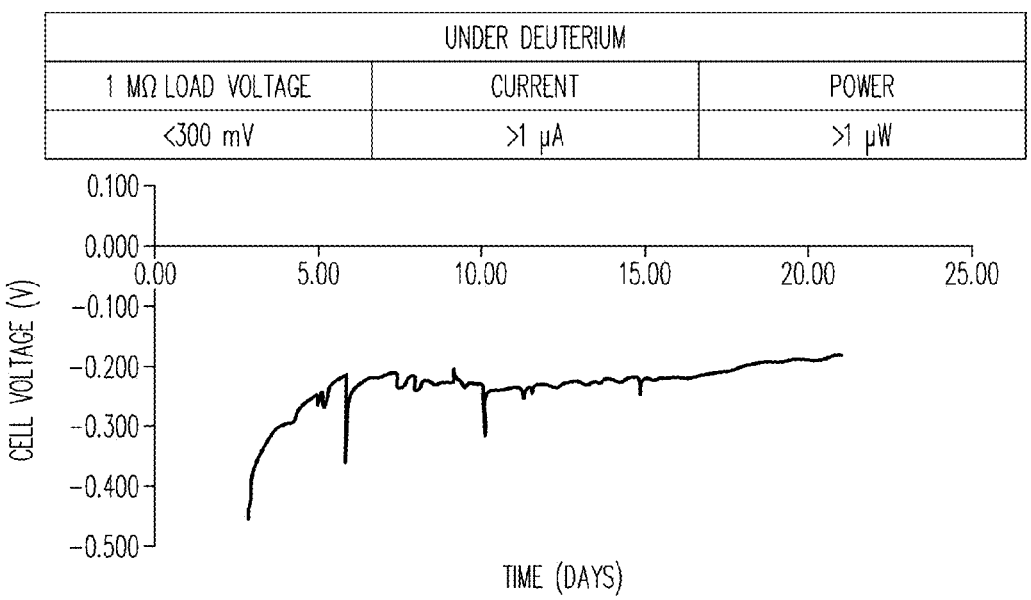
Figure 22C:
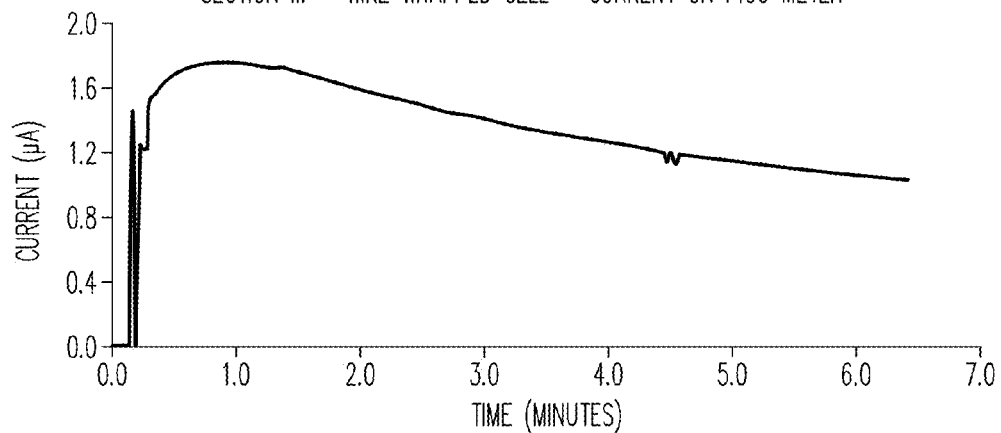

Referring to FIGS. 22A to 22C, testing of a tubular spiral wire wound test cell 90, constructed in accordance with cell II, shown in FIGS. 18-20, having the loose powder forming anode 94 contained within elongated paper straw insulator tube 92 wrapped with thin copper wire 96 forming a cathode was performed. Sealed ends 100 define a sealed volume within insulator tube 92, inlet 98 sealing, exiting one end 100 provided to introduce $D_2$ or $H_2$ into cell 90.

In FIG. 22A, after cell 90 is fully pressurized with $D_2$, the open voltage of the cell maintained at over 250 mV for a period of over two days. In FIG. 22B, the voltage under a resistive load of 1 MΩ started near 450 mV and drained to near 150 mV after 15 days. In FIG. 22C, spiral wrapped cell 90, being fully pressurized with $D_2$, was measured for current using a picometer. The cell loaded $D_2$ quickly, rose to 1.8 µA and after two hours the cell settled to 1.2 µA.

Figure 25A:
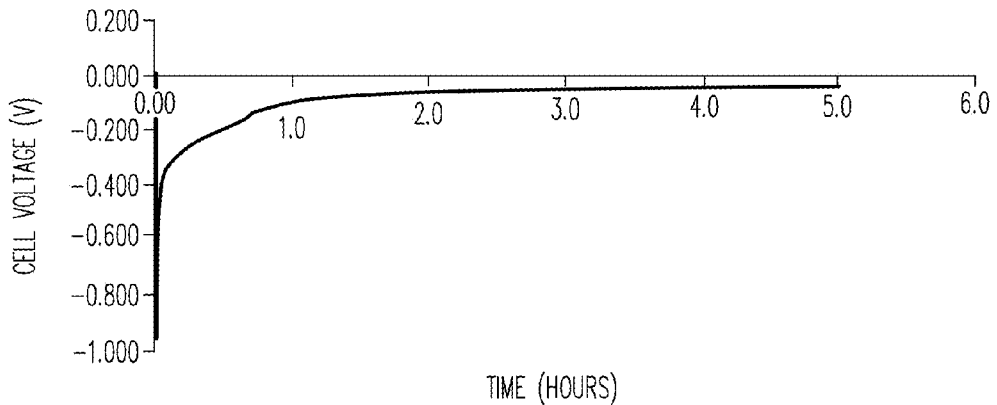
Figure 25B:
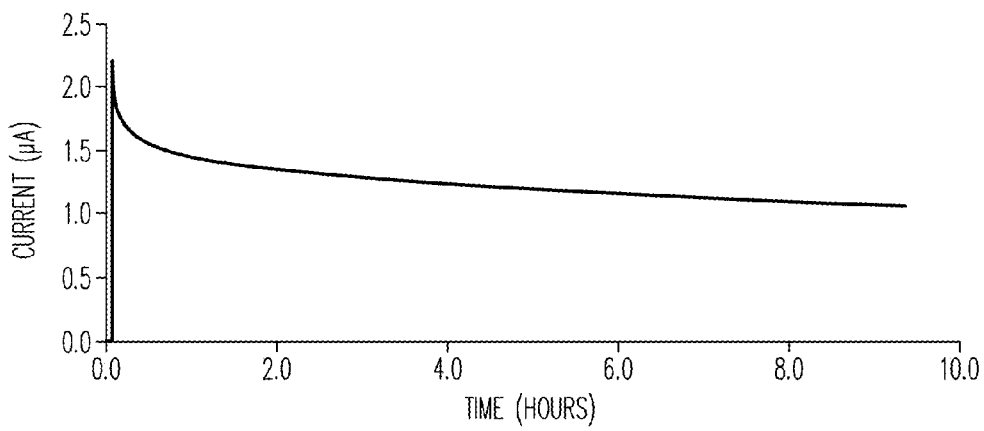

Referring to FIG. 25A to 25B, the test cell was constructed in accordance cell V. After cell V is fully pressurized with $D_2$ the initial open voltage was about 1,000 mV, stabilizing to 100 mV after 0.5 days and maintained at 100 mV for two days. In FIG. 25B, after cell V is fully pressurized with $D_2$, the current of the cell was measured using a picometer. The cell loaded $D_2$ peaked at 2.1 µA, diminishing to 1.2 µA range for period of 10 hours.

Figure 26A:
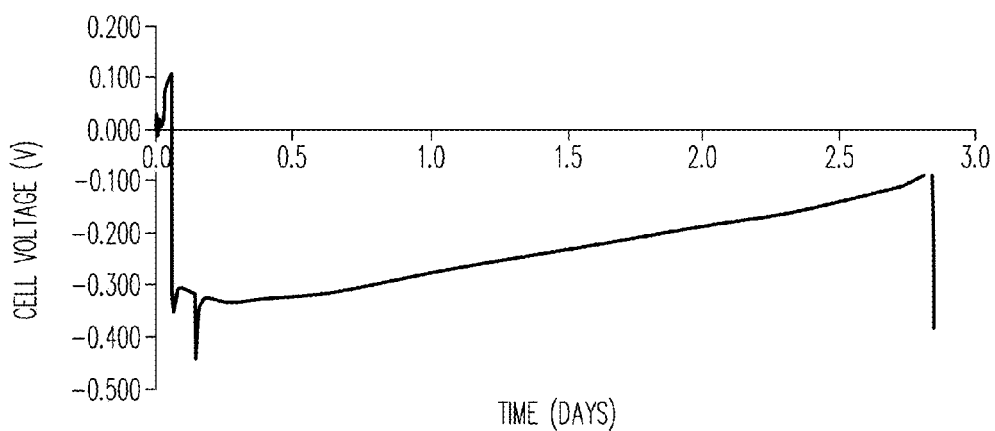
Figure 26B:
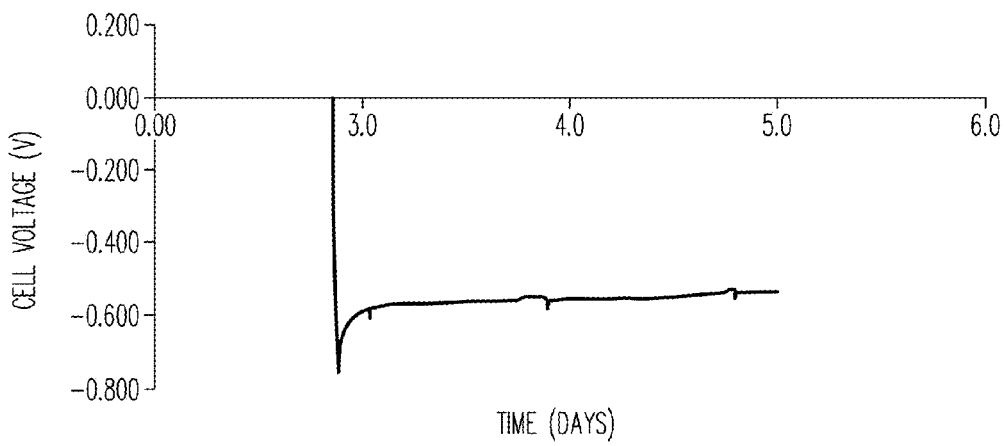

Referring to FIGS. 26A to 26B, a test cell was constructed in accordance with cell VI. After cell VI is fully pressurized with $D_2$ the initial open voltage of the cell was about 350 mV, stabilizing to 100 mV after nearly three days. After re-pressuring with $D_2$, the voltage increased to over 300 mV. Referring to FIG. 26B, after the cell was re-pressurized with $D_2$, the voltage under a resistive load of 1 MΩ of the cell was initially near 750 mV and drained to near 575 mV after five days.

Figure 27:
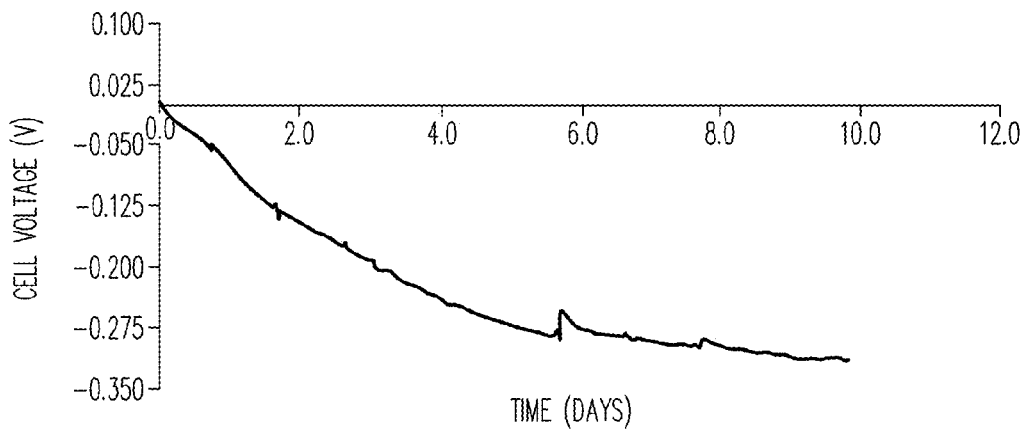

Referring to FIG. 27, a test cell was constructed in accordance with cell VI. Lanthanum Nickel ($LaNi_5$) was substituted for PdC. After the cell was fully pressurized with $D_2$, the open voltage of the cell was about 0 mV, increasing steadily to 280 mV after nearly 10 days.

Figure 28:
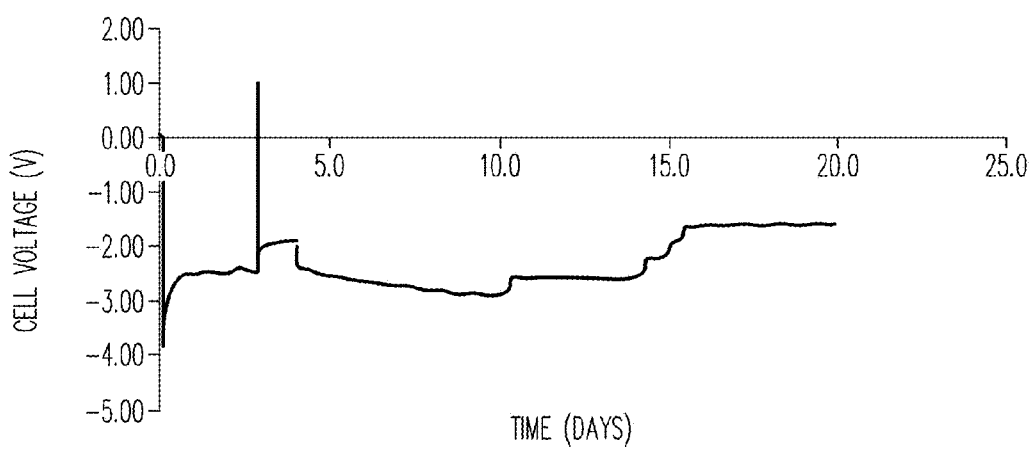

Referring to FIG. 28, a test cell was constructed in accordance with cell VI as a seven stack cell. After the cell was fully pressurized with $D_2$ the open voltage of the cell was measured. The initial open voltage was about 4,000 mV. The cell stabilized after 15 days to 1,000 mV. During the 15 day period, at about day 3, an LED was momentarily inserted into the circuit causing a spike decrease in the voltage.

Figure 29A:
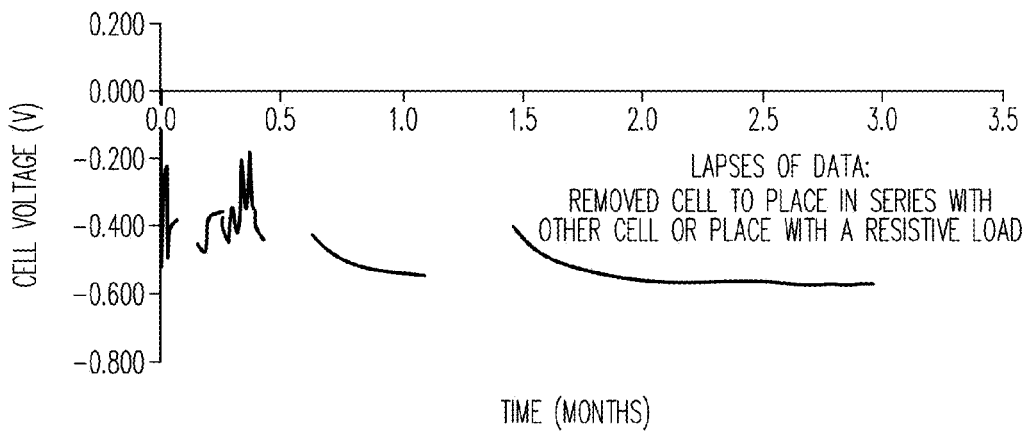
Figure 29B:
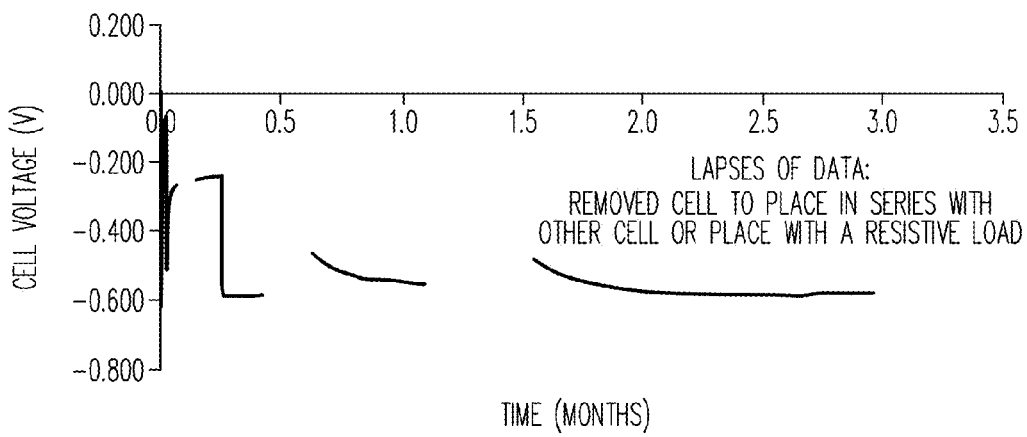
Figure 29C:
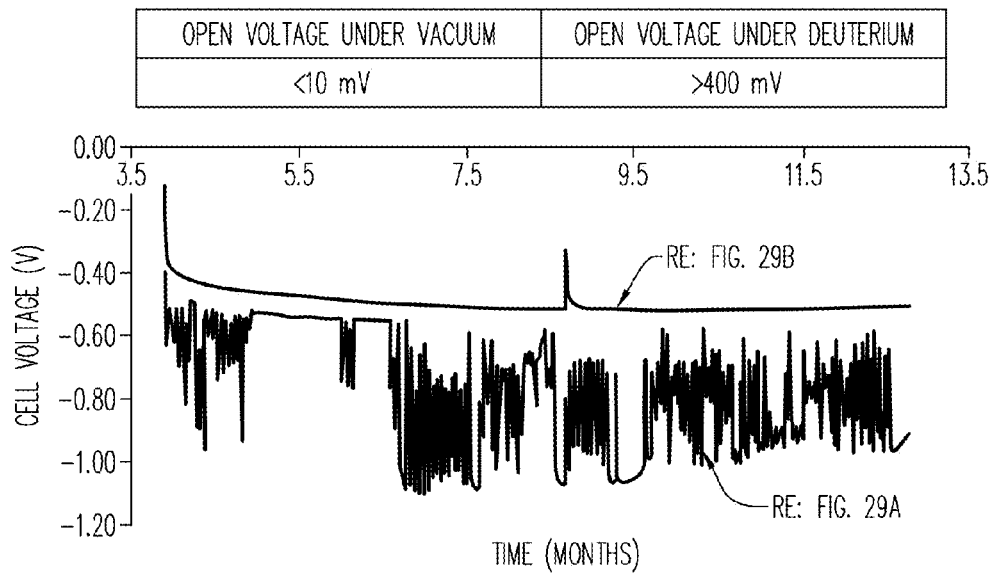

Referring to FIG. 29A to 29C, these two test cells were constructed in accordance with cell VI and were run for longer periods of time. These cells were pellet cells held together by epoxy, in a small glass bottle. After the cell was fully pressurized with $D_2$ the open voltage of the cell was measured. The initial open voltage was near 500 mV. After about a period of 60 days the cell stabilized at 550 mV. Interruptions in the graph were due to resistive load testing and adding the cell in series with other cells. In FIG. 29B, the cell was fully pressurized with $H_2$, then in seven days, pressurized with $D_2$, the open voltage of the cell was measured. The initial open voltage was about 550 mV under hydrogen, draining to about 200 mV. When the cell was pressurized with $D_2$, the voltage gradually increased to 575 mV. After about a period of 60 days, the cell stabilized at 550 mV. Interruptions in the graph were due to resistive load testing and adding the cell in series with other cells. In FIG. 29C, the cells were re-pressurized at about three months and the open voltage of the cells was measured. FIG. 29C is a continuation in time of FIGS. 29A and 29B. Referencing FIG. 29B, the initial voltage of 100 mV quickly increased, stabilizing at 450 mV after seven months, and maintaining up to 550 mV for over one year. Referencing 294. the initial voltage of 400 mV erratically fluctuated between about 550 mV to 1,000 mV, maintaining erratic voltage for over one year.

Figure 30A:
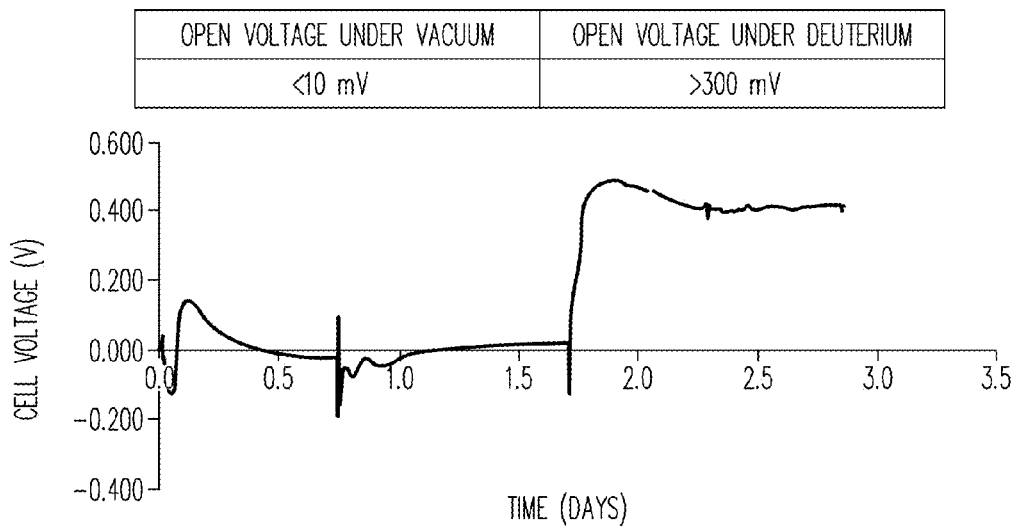
Figure 30B:
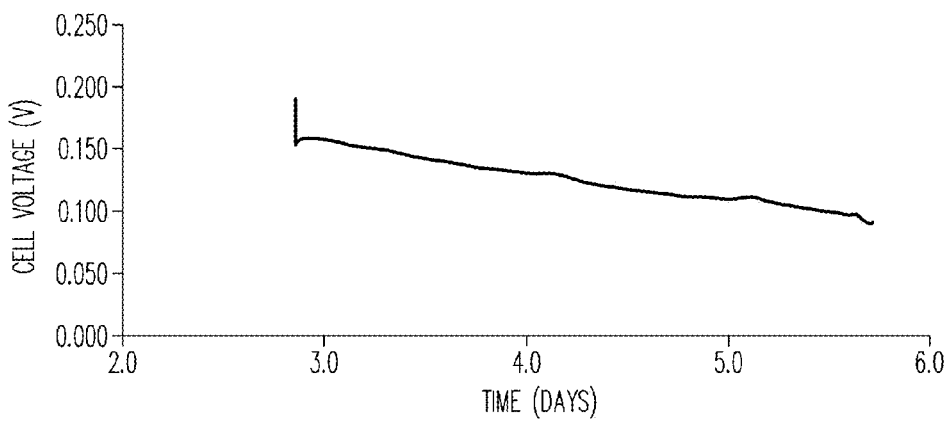

Referring to FIGS. 30A to 30B, a test cell was constructed in accordance with cell VII. In FIG. 30A, after cell VII was fully pressurized with $D_2$, the open voltage of the cell was measured. The initial open voltage fluctuated about zero, rapidly increased at 1.7 days to about 500 mV stabilizing at 400 mV after the re-pressurization with $D_2$ occurred. In FIG. 30B, a time continuation of 30A, the voltage under a resistive load of 1 MΩ, was measured. The voltage was initially near 200 mV, steadily decreasing to near 75 mV after six days.

Figure 31A:
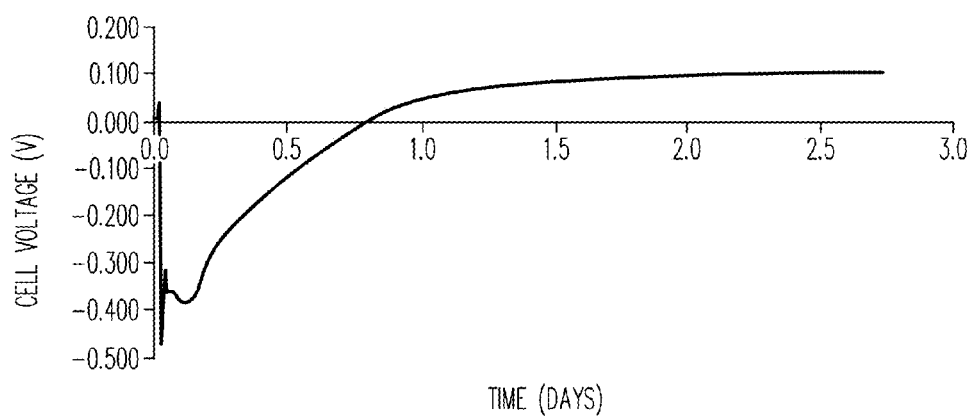
Figure 31B:
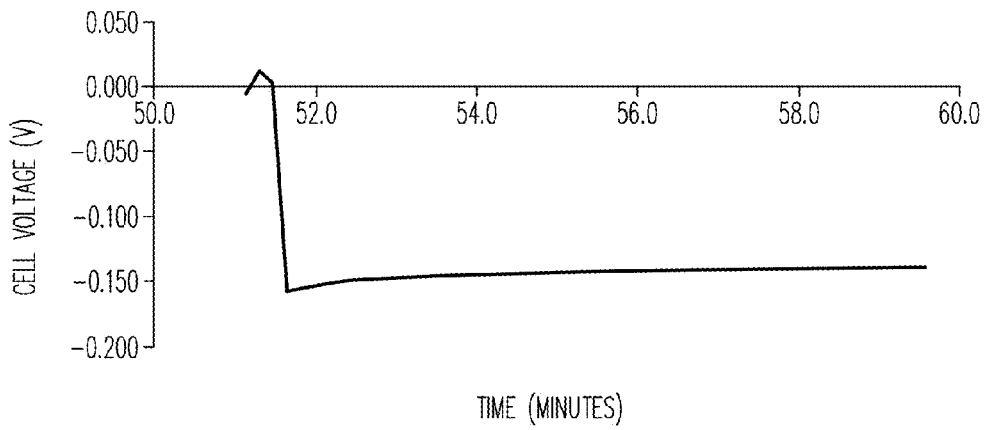

Referring to FIGS. 31A to 31B, a test cell was constructed in accordance cell VIII. In FIG. 31A, after cell VIII was fully pressurized with $D_2$, the open voltage of the cell was measured. The initial open voltage spiked to about 500 mV, decreasing and changing polarity in less than one day. The cell held at 100 mV in the opposite polarity for over 2.5 days. In FIG. 31B, the voltage under a resistive load of 5 MΩ was measured. The voltage spiked to 150 mV, then held steadily at 125 mV for about an hour.

Figure 32A:
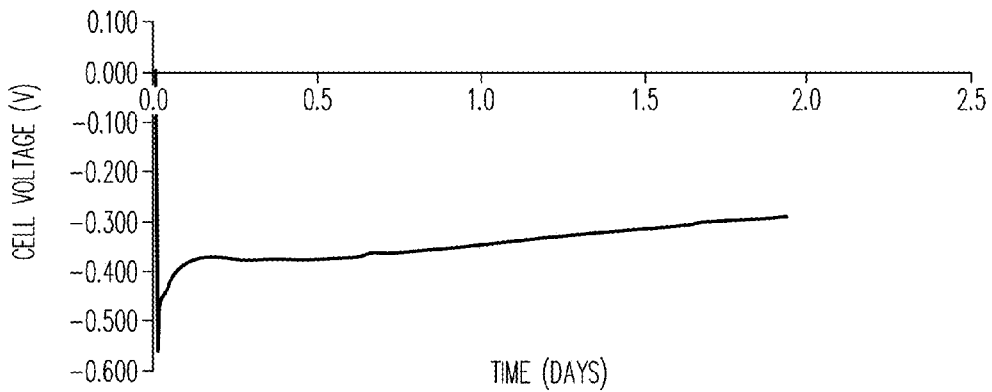
Figure 32B:
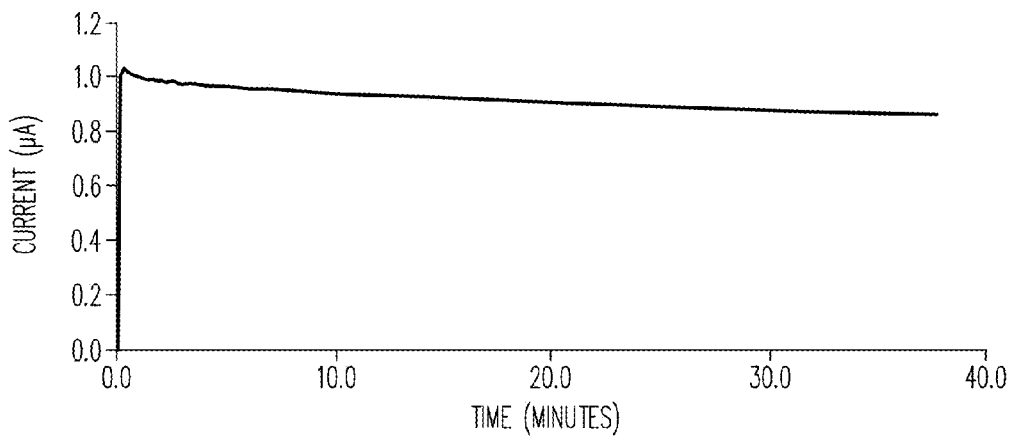

Referring to FIGS. 32A to 32B, a test cell was constructed in accordance with cell IX. After cell IX was fully pressurized with $D_2$, the open voltage of the cell was measured. The initial open voltage spiked to about 575 mV, gradually decreasing to 250 mV after two days. In FIG. 32B, after cell IX was fully pressurized with $D_2$, the current of the cell was measured using a picometer. Voltage peaked at 1 µA, diminishing to about 0.9 µA range for period of less than one hour.

Figure 33:
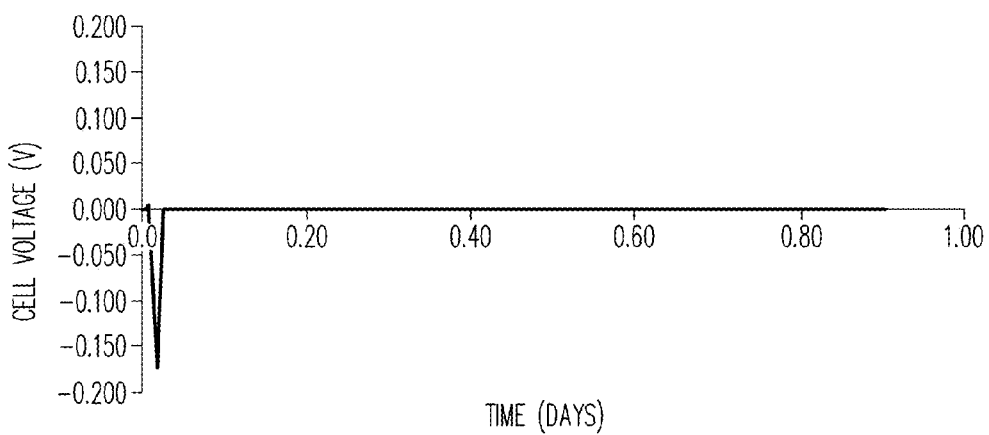

Referring to FIG. 33, a test cell was constructed in accordance with cell X. In FIG. 33, after cell X was fully pressurized with $D_2$ the open voltage of the cell spiked to about 175 mV, gradually. decreasing to 0 mV after one day.

Figure 34A:
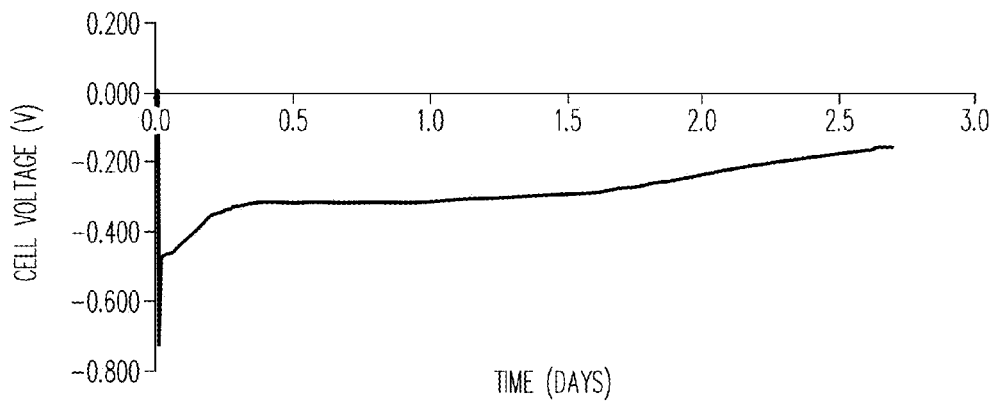
Figure 34B:
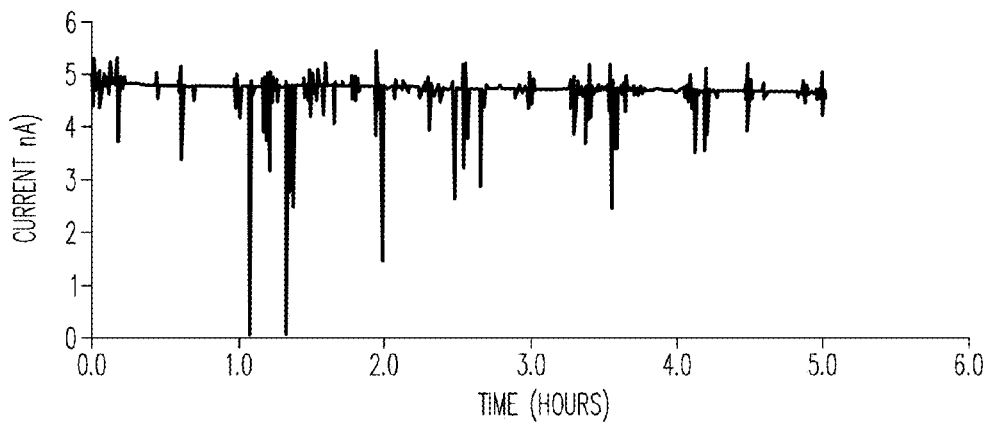

Referring to FIGS. 34A to 34B, a test cell was constructed in accordance with cell XI. After cell XI was fully pressurized with $D_2$, the open voltage of the cell spiked to about 700 mV, gradually decreasing to 100 mV after 2.5 days. In FIG. 34B, the current of the cell was measured using a picometer. The cell maintained about 5 nA, with erratic spikes for less than one hour.

Figure 35A:
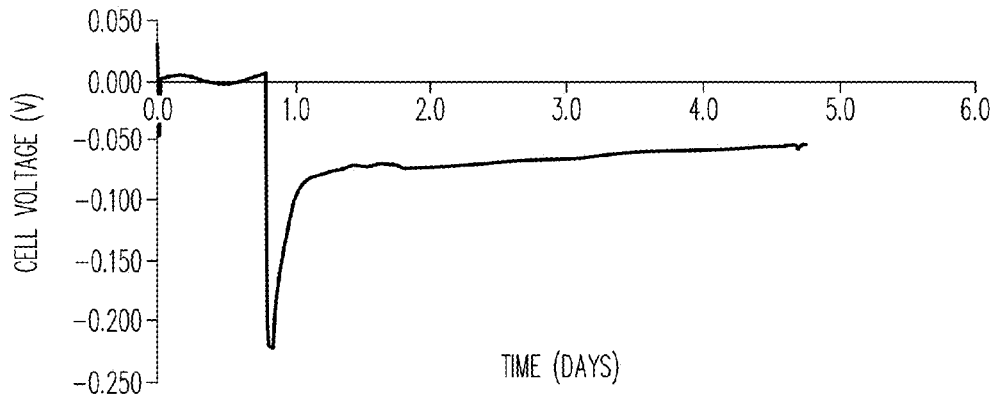
Figure 35B:
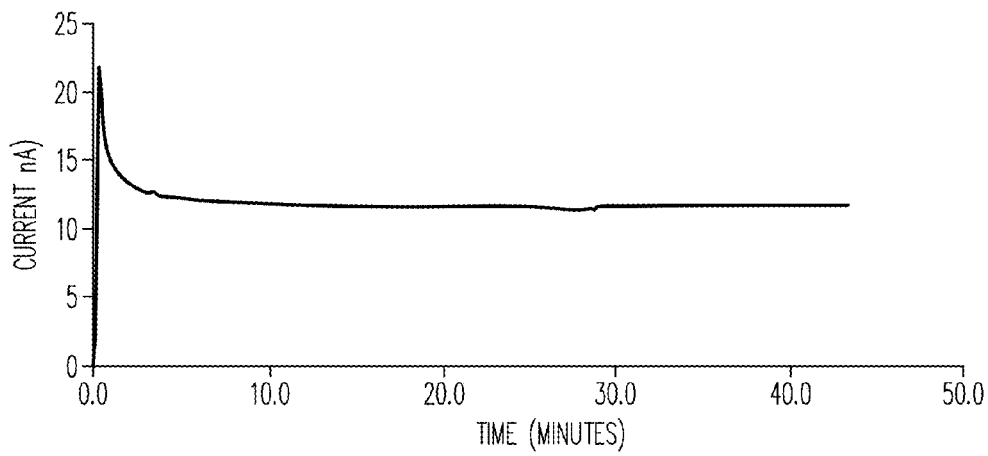

Referring to FIGS. 35A to 35B, a test cell was constructed in accordance with cell XII. In FIG. 35A, after cell XII was fully pressurized with $D_2$, the open voltage of the cell spiked to about 225 mV, decreasing to 50 mV after one day. In FIG. 35B, the current of the cell was measured using a picometer. The cell current spiked to 202 nA and drained and held at about 12 nA, for less than one hour.

Findings of Performance Testing

Palladium Conductor (PdC) exposed to an atmosphere of $H_2$ or $D_2$ will allow ions to pass across an electrical insulator.

Alkali metal salts with a halide anion may maintain the electrical conductance across the insulator longer than the PdC alone.

Alkali metal with $OH^-$ will prevent electrical conductance across the electrical insulator. Other basic salts may also interfere.

$D_2$ may extend the time of, or increase the conductance of, the cell.

Smaller gas volume vs. reactant volumes seem to be producing more electrical power.

While a number of exemplary aspects and embodiments that have been discussed above, those skilled in the art will recognize certain modifications, permutations and additions and sub combinations thereof. It is therefore intended that the following appended claims and claims hereinafter introduced are interpreted to include all such modifications, permutations, additions and sub combinations that are within their true spirit and scope.

The improved energy cell previously described generates electrical voltage through the ionization of a gas. The improved energy cell Incorporates a different and unique method of generating electrical energy from conventional devices of the prior art such as fuel cells and the like.

The different and unique method of generating electrical energy comprises connecting a first electrically conductive terminal (ECT) to a first surface of a palladium component within a sealed housing and positioning a first surface of an insulator against a second surface of the palladium component. A second electrically conductive terminal (ECT) is connected to a second surface of the insulator. Deuterium is introduced to the palladium component to generate electrical energy between the first and second electrically conductive terminals (ECT).

The improved energy cell may be modified to function as a deuterium actuated switch by connecting a voltage actuated switch to the first and second conductors. The switch is actuated by an electrical voltage produced by the reaction between deuterium with the palladium component. The deuterium actuated switch may also be used in a method of detecting the presence of deuterium.

While a number of exemplary aspects and embodiments that have been discussed above, those skilled in the art will recognize certain modifications, permutations and additions and sub combinations thereof. It is therefore intended that the following appended claims and claims hereinafter introduced are interpreted to include all such modifications, permutations, additions and sub combinations that are within their true spirit and scope.

What is claimed is:

1. An improved energy cell for generating electrical voltage through the ionization of a gas, comprising:
   a housing having a sealed interior volume;
   an ionizing material located within said interior volume for absorbing the gas and separating ions and electrons from the gas;
   an electron collector located within said interior volume and proximate to said ionizing material for receiving electrons from said ionizing material;
   an ion collector located within said interior volume for receiving and collecting ions from said ionizing material;
   an insulator material located within said interior volume positioned between said ionizing material and said ion collector; and
   a sealable housing inlet openable for one-time only introduction of the gas into said housing, after which said inlet is resealable, introduction of the gas producing electrical voltage between said electron collector and said ion collector.

2. The improved energy cell of claim 1 wherein:
the gas consists essentially of hydrogen gas and isotopes thereof; and
said ionizing material is a hydrogen/deuterium gas absorbing material which separates the ions and electrons from the gas.

3. The improved energy cell of claim 1 wherein said ionizing material is a palladium material.

4. The improved energy cell of claim 1 wherein:
the gas consists essentially of hydrogen gas and isotopes thereof; and
said ionizing material is a conductive hydrogen/deuterium gas absorbing material which separates and releases the ions from the ionizing material.

5. The energy cell of claim 1 further comprising:
a first electrically conductive terminal (ECT1) electrically connected to said ion collector;
said first electrically conductive terminal (ECT1) being a non-hydrogen absorbing metal or alloy; and
a second electrically conductive terminal (ECT2) electrically connected to said ionizing material.

6. The energy cell of claim 1, further comprising:
a first electrically conductive terminal (ECT1) electrically connected to said ion collector;
said first electrically conductive terminal (ECT1) being a non-hydrogen absorbing metal or alloy;
a second electrically conductive terminal (ECT2) electrically connected to said ionizing material; and
a first and second electrical contact (L1, L2) electrically connecting said first and second electrically conductive terminals (ECT1, ECT2) to an electrical load external said housing.

7. The energy cell of claim 1, further comprising:
a first electrically conductive terminal (ECT1) electrically connected to said ion collector;
said first electrically conductive terminal (ECT1) being a non-hydrogen absorbing metal or alloy;
a second electrically conductive terminal (ECT2) electrically connected to said ionizing material;
a first semiconductor interposed between said electron collector and said first electrically conductive terminal (ECT1); and
a second semiconductor interposed between said ionizing material and said second electrically conductive terminal (ECT2).

8. An improved energy cell for generating electrical voltage through the ionization of a gas, comprising:
a sealed housing having an interior volume;
an ionizing material located within said interior volume for absorbing the gas and separating ions and electrons from the gas;
an electron collector located within said interior volume and proximate to said ionizing material for receiving electrons from said ionizing material;
an ion collector located within said interior volume for receiving and collecting ions from said ionizing material;
an insulator material located within said interior volume positioned between said ionizing material and said ion collector; and
a sealed housing inlet for introducing the gas into said housing and providing an only input for generating electrical voltage between said electron collector and said ion collector;
said insulator material enabling the gas and the ions to pass around said ionizing material and to permeate throughout said interior volume of said housing.

9. An improved energy cell for generating electrical voltage through the ionization of a gas, comprising:
a sealed housing having an interior volume;
an ionizing material located within said interior volume for absorbing the gas and separating ions and electrons from the gas;
an electron collector located within said interior volume and proximate to said ionizing material for receiving electrons from said ionizing material;
an ion collector located within said interior volume for receiving and collecting ions from said ionizing material;
an insulator material located within said interior volume and positioned between said ionizing material and said ion collector; and
a sealable housing inlet for introducing the gas into said housing;
electrical voltage being generated between said electron collector and said ion collector only by an initial one-time introduction of the gas into said housing, when said inlet is opened after which said inlet is sealed.

* * * * *